US012634650B2

(12) United States Patent (10) Patent No.: US 12,634,650 B2
Ding (45) Date of Patent: May 19, 2026

(54) AUDIO PROCESSING METHOD AND TERMINAL

(71) Applicant: HUAWEI TECHNOLOGIES CO., LTD., Guangdong (CN)

(72) Inventor: Jiance Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 18/785,171

(22) Filed: Jul. 26, 2024

(65) Prior Publication Data

US 2024/0388866 A1 Nov. 21, 2024

Related U.S. Application Data

(63) Continuation of application No. PCT/CN2022/140200, filed on Dec. 20, 2022.

(30) Foreign Application Priority Data

Jan. 28, 2022 (CN) .......................... 202210109139.4

(51) Int. Cl.
 H04S 7/00 (2006.01)
 G10L 19/008 (2013.01)
 H04N 19/44 (2014.01)
(52) U.S. Cl.
 CPC ............ H04S 7/302 (2013.01); G10L 19/008 (2013.01); H04N 19/44 (2014.11); *H04S 2400/11* (2013.01); *H04S 2420/03* (2013.01)
(58) Field of Classification Search
 CPC .. H04S 7/302; H04S 2400/11; H04S 2420/03; H04N 19/44; G10L 19/008

USPC .............................................................. 381/1
See application file for complete search history.

(56) References Cited

U.S. PATENT DOCUMENTS

| 2008/0175394 A1* | 7/2008 | Goodwin | ................ | H04S 3/008 |
| | | | | 381/1 |
| 2010/0316224 A1* | 12/2010 | Lau | ........................... | H04S 7/30 |
| | | | | 381/17 |
| 2012/0314875 A1* | 12/2012 | Lee | ........................ | G10L 19/008 |
| | | | | 381/23 |

(Continued)

FOREIGN PATENT DOCUMENTS

| JP | 2020527746 A | 9/2020 |
| JP | 2020527887 A | 9/2020 |

(Continued)

*Primary Examiner* — Sean H Nguyen

(57) ABSTRACT

An audio processing method and a terminal are disclosed. The method includes: decoding an audio bitstream to obtain audio optimization metadata, basic audio metadata, and M pieces of decoded audio data, the audio optimization metadata includes first metadata of a first optimized listening area and a first decoding audio mixing parameter corresponding to the first optimized listening area; rendering M pieces of decoded audio data based on a current location of a user and the basic audio metadata, to obtain M pieces of rendered audio data; and when the current location is in the first optimized listening area, performing first audio mixing on the M pieces of rendered audio data based on the first decoding audio mixing parameter, to obtain M pieces of first audio mixing data, and mixing the M pieces of first audio mixing data, to obtain mixed audio data corresponding to the first optimized listening area.

20 Claims, 10 Drawing Sheets

(56) References Cited

U.S. PATENT DOCUMENTS

| | | | |
|---|---|---|---|
| 2015/0235645 A1* | 8/2015 | Hooks | G10L 19/008 |
| | | | 704/500 |
| 2016/0029140 A1* | 1/2016 | Mehta | G10L 19/20 |
| | | | 381/307 |
| 2020/0162833 A1 | 5/2020 | Lee et al. | |
| 2020/0374646 A1 | 11/2020 | Lee et al. | |
| 2021/0120360 A1 | 4/2021 | Terentiv et al. | |

FOREIGN PATENT DOCUMENTS

| | | | |
|---|---|---|---|
| KR | 20140128567 A | 11/2014 |
| WO | 2021170900 A1 | 9/2021 |
| WO | 2022110722 A1 | 6/2022 |

* cited by examiner

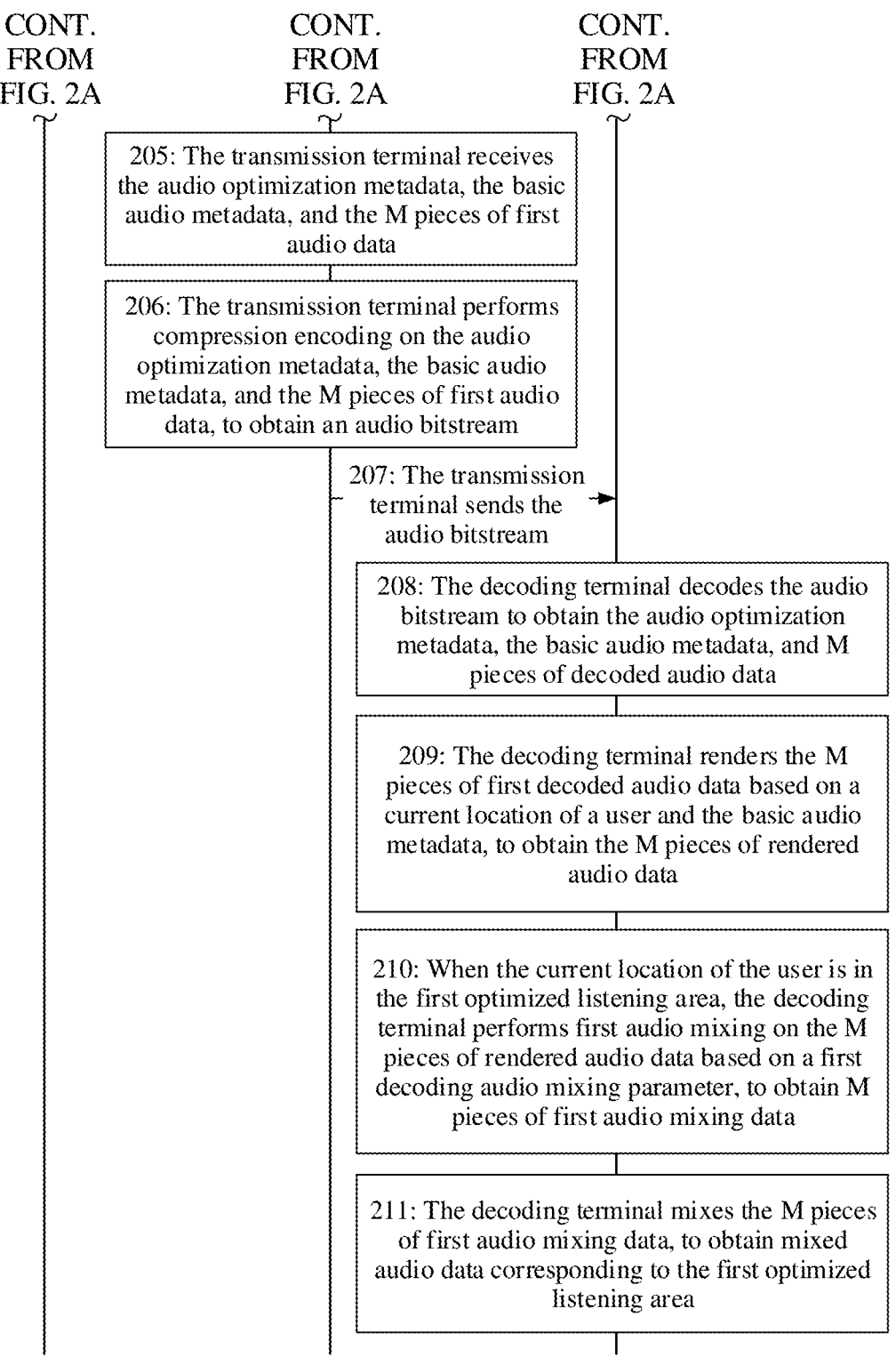

CONT. FROM FIG. 2A        CONT. FROM FIG. 2A        CONT. FROM FIG. 2A

205: The transmission terminal receives the audio optimization metadata, the basic audio metadata, and the M pieces of first audio data 206: The transmission terminal performs compression encoding on the audio optimization metadata, the basic audio metadata, and the M pieces of first audio data, to obtain an audio bitstream 207: The transmission terminal sends the audio bitstream 208: The decoding terminal decodes the audio bitstream to obtain the audio optimization metadata, the basic audio metadata, and M pieces of decoded audio data 209: The decoding terminal renders the M pieces of first decoded audio data based on a current location of a user and the basic audio metadata, to obtain the M pieces of rendered audio data 210: When the current location of the user is in the first optimized listening area, the decoding terminal performs first audio mixing on the M pieces of rendered audio data based on a first decoding audio mixing parameter, to obtain M pieces of first audio mixing data 211: The decoding terminal mixes the M pieces of first audio mixing data, to obtain mixed audio data corresponding to the first optimized listening area

FIG. 2B

AUDIO PROCESSING METHOD AND TERMINAL

CROSS-REFERENCE TO RELATED APPLICATIONS

This application is a continuation of International Application No. PCT/CN2022/140200, filed on Dec. 20, 2022, which claims priority to Chinese Patent Application No. 202210109139.4, filed on Jan. 28, 2022. The disclosures of the aforementioned applications are hereby incorporated by reference in their entireties.

TECHNICAL FIELD

This application relates to the audio technology field, and in particular, to an audio processing method and a terminal.

BACKGROUND

Audio mixing is an essential step in music production, and quality of audio mixing determines success or failure of a music work. An audio output after audio mixing enables an audience to hear delicate and layered music effect that cannot be heard during live recording, making music more expressive.

A virtual reality (VR) technology is gradually applied to the music field, and a VR music scene emerges. Currently, in a process of creating the VR music scene, when mixing music signals, a creator usually assumes that a user is located in a sweet area and a location remains unchanged. Therefore, this type of VR music scene can implement head rotation (for example, three degrees of freedom (3DoF)) effect of the user. The user can have a good music experience only when the user is in the sweet area. If the location of the user is changed, the listening effect of the user becomes poor, and the music experience of the user is further affected.

SUMMARY

Embodiments of this application provide an audio processing method and a terminal, to improve listening effect obtained when a user moves freely.

To resolve the foregoing technical problem, embodiments of this application provide the following technical solutions.

According to a first aspect, an embodiment of this application provides an audio processing method, including:

decoding an audio bitstream to obtain audio optimization metadata, basic audio metadata, and M pieces of decoded audio data, where the audio optimization metadata includes first metadata of a first optimized listening area and a first decoding audio mixing parameter corresponding to the first optimized listening area, and M is a positive integer;

rendering M pieces of decoded audio data based on a current location of a user and the basic audio metadata, to obtain M pieces of rendered audio data;

when the current location is in the first optimized listening area, performing first audio mixing on the M pieces of rendered audio data based on the first decoding audio mixing parameter, to obtain M pieces of first audio mixing data; and mixing the M pieces of first audio mixing data, to obtain mixed audio data corresponding to the first optimized listening area.

In the foregoing solution, the metadata of the first optimized listening area and the first decoding audio mixing parameter corresponding to the first optimized listening area may be obtained, and the M pieces of decoded audio data are rendered based on the current location of the user and the basic audio metadata, to obtain the M pieces of rendered audio data. Then, when it is determined that the current location of the user is in the first optimized listening area, first audio mixing is performed on the M pieces of rendered audio data based on the first decoding audio mixing parameter, to obtain the M pieces of first audio mixing data. Finally, the M pieces of first audio mixing data are mixed, to obtain the mixed audio data corresponding to the first optimized listening area. Therefore, in this embodiment, when the current location of the user is located in the first optimized listening area, both audio mixing and data mixing are implemented by using audio data corresponding to the first optimized listening area, so that audio optimization metadata suitable for the user to freely move to the first optimized listening area can be provided, and listening effect obtained when the user moves freely can be improved.

In a possible implementation, the audio optimization metadata further includes a second decoding audio mixing parameter corresponding to the first optimized listening area.

The method further includes performing second audio mixing on the mixed audio data based on the second decoding audio mixing parameter, to obtain second audio mixing data corresponding to the first optimized listening area.

In the foregoing solution, after obtaining the second decoding audio mixing parameter, a decoding terminal may further perform, based on the second decoding audio mixing parameter corresponding to the first optimized listening area, second audio mixing on the mixed audio data corresponding to the first optimized listening area, to obtain the second audio mixing data corresponding to the first optimized listening area. The second audio mixing data can be obtained through the second audio mixing. When the second audio mixing data is played, listening effect of the user can be improved.

In a possible implementation, the second decoding audio mixing parameter includes at least one of the following: an identifier of the second audio mixing data, an equalization parameter, a compressor parameter, and a reverberator parameter.

In the foregoing solution, the second decoding audio mixing parameter may include the identifier of the second audio mixing data. The second decoding audio mixing parameter may further include the equalization parameter. For example, the equalization parameter may include an equalization parameter identifier, a gain value of each frequency band, and a Q value. The Q value is a parameter of an equalization filter, represents a quality factor of the equalization filter, and may be used to describe bandwidth of the equalization filter. The second decoding audio mixing parameter may further include the compressor parameter. For example, the compressor parameter may include a compressor identifier, a threshold, a compression ratio, a start time, a release time, and a gain compensation value. The second decoding audio mixing parameter may further include the reverberator parameter. For example, the reverberator parameter may include a reverberation type, a reverberation time, a delay time, and a direct-to-reverberant ratio.

In a possible implementation, the audio optimization metadata further includes: N−1 difference parameters of N−1 second decoding audio mixing parameters corresponding to N−1 optimized listening areas other than the first optimized listening area in N optimized listening areas with respect to the second decoding audio mixing parameter corresponding to the first optimized listening area, where N is a positive integer.

In the foregoing solution, the difference parameters are parameters of difference parts between the N−1 second decoding audio mixing parameters of the N−1 optimized listening areas other than the first optimized listening area in the N optimized listening areas and the second decoding audio mixing parameter corresponding to the first optimized listening area. The difference parameters are not the N−1 second decoding audio mixing parameters of the N−1 optimized listening areas. The audio optimization metadata carries the difference parameters, so that a data volume of the audio optimization metadata can be reduced, and data transmission efficiency and decoding efficiency can be improved.

In a possible implementation, the first decoding audio mixing parameter includes at least one of the following: an identifier of the rendered audio data, an equalization parameter, a compressor parameter, and a reverberator parameter.

In the foregoing solution, the first decoding audio mixing parameter may include the identifier of the rendered audio data, for example, identifiers of the M pieces of rendered audio data. The first decoding audio mixing parameter may further include the equalization parameter. For example, the equalization parameter may include an equalization parameter identifier, a gain value of each frequency band, and a Q value. The first decoding audio mixing parameter may further include the compressor parameter. For example, the compressor parameter may include the compressor identifier, the threshold, the compression ratio, the start time, the release time, and the gain compensation value. The first decoding audio mixing parameter may further include the reverberator parameter. For example, the reverberator parameter may include the reverberation type, the reverberation time, the delay time, and the direct-to-reverberant ratio.

In a possible implementation, the method further includes:
  decoding a video image bitstream to obtain decoded video image data and video image metadata, where the video image metadata includes video metadata and image metadata;
  rendering the decoded video image data based on the video image metadata, to obtain rendered video image data;
  establishing a virtual scene based on the rendered video image data; and
  identifying the first optimized listening area in the virtual scene based on the rendered video image data and the audio optimization metadata.

In the foregoing solution, the decoding terminal renders the decoded video image data based on the video image metadata, to obtain the rendered video image data, and the decoding terminal may establish the virtual scene by using the rendered video image data. Finally, the decoding terminal identifies the first optimized listening area in the virtual scene based on the rendered video image data and the audio optimization metadata, so that the decoding terminal side displays the first optimized listening area in the virtual scene, and guides the user to experience music in the optimized listening area, thereby improving listening effect of the user.

In a possible implementation, the first metadata includes at least one of the following: a reference coordinate system of the first optimized listening area, central location coordinates of the first optimized listening area, and a shape of the first optimized listening area.

In the foregoing solution, the metadata of the first optimized listening area may include the reference coordinate system, or the metadata of the first optimized listening area may not include the reference coordinate system. For example, the first optimized listening area uses a default coordinate system. The metadata of the first optimized listening area may include description information for describing the first optimized listening area, for example, information for describing the central location coordinates of the first optimized listening area, and the shape of the first optimized listening area. In this embodiment, there may be a plurality of shapes of the first optimized listening area. For example, the shape may be a sphere, a cube, a column, or any other shape.

In a possible implementation, the audio optimization metadata includes: N−1 difference parameters of N−1 first decoding audio mixing parameters corresponding to the N−1 optimized listening areas other than the first optimized listening area in the N optimized listening areas with respect to the first decoding audio mixing parameter corresponding to the first optimized listening area, where N is a positive integer.

In the foregoing solution, the difference parameters are parameters of difference parts between the N−1 first decoding audio mixing parameters of the N−1 optimized listening areas other than the first optimized listening area in the N optimized listening areas and the first decoding audio mixing parameter corresponding to the first optimized listening area. The difference parameters are not the N−1 first decoding audio mixing parameters of the N−1 optimized listening areas. The audio optimization metadata carries the difference parameters, so that the data volume of the audio optimization metadata can be reduced, and data transmission efficiency and decoding efficiency can be improved.

According to a second aspect, an embodiment of this application further provides an audio processing method, including:
  receiving audio optimization metadata, basic audio metadata, and M pieces of first audio data, where the audio optimization metadata includes first metadata of a first optimized listening area and a first audio mixing parameter corresponding to the first optimized listening area, and M is a positive integer;
  performing compression encoding on the audio optimization metadata, the basic audio metadata, and the M pieces of first audio data, to obtain an audio bitstream; and
  sending the audio bitstream.

In the foregoing solution, the audio optimization metadata, the basic audio metadata, and the M pieces of first audio data are first received, and the audio optimization metadata includes the metadata of the first optimized listening area and the first audio mixing parameter of the first optimized listening area. Therefore, audio optimization metadata suitable for a user to freely move to the first optimized listening area can be provided, and listening effect obtained when the user moves freely can be improved.

In a possible implementation, the audio optimization metadata further includes a second audio mixing parameter change identifier.

The second audio mixing parameter change identifier indicates whether a second audio mixing parameter corresponding to first audio data of a current frame changes compared with a second audio mixing parameter corresponding to first audio data of a previous frame.

In the foregoing solution, a transmission terminal may set the second audio mixing parameter change identifier in the audio optimization metadata. The second audio mixing parameter change identifier indicates whether a second audio mixing parameter corresponding to the first optimized listening area changes. Therefore, a decoding terminal determines, based on the second audio mixing parameter change identifier, whether the second audio mixing parameter corresponding to the first optimized listening area changes. For example, when the second audio mixing parameter corresponding to the first audio data of the current frame changes compared with the second audio mixing parameter corresponding to the first audio data of the previous frame, the second audio mixing parameter change identifier is true, and the transmission terminal may further send change information of the second audio mixing parameter corresponding to the first audio data. The decoding terminal receives the change information of the second audio mixing parameter corresponding to the first audio data, and obtains, based on the change information, a changed second audio mixing parameter corresponding to the first audio data of the current frame.

In a possible implementation, the audio optimization metadata further includes the second audio mixing parameter corresponding to the first optimized listening area.

In the foregoing solution, when a production terminal performs audio mixing twice, the audio optimization metadata obtained by the production terminal may include the first metadata of the first optimized listening area, the first audio mixing parameter corresponding to the first optimized listening area, and the second audio mixing parameter corresponding to the first optimized listening area. After the audio optimization metadata is obtained by the decoding terminal, the decoding terminal also needs to perform audio mixing twice, and listening effect of the user can be improved by performing the audio mixing twice.

In a possible implementation, the audio optimization metadata further includes the second audio mixing parameter corresponding to the first optimized listening area in N optimized listening areas, and N−1 difference parameters of N−1 second audio mixing parameters corresponding to N−1 optimized listening areas other than the first optimized listening area in the N optimized listening areas with respect to the second audio mixing parameter corresponding to the first optimized listening area, where N is a positive integer.

In the foregoing solution, the difference parameters are parameters of difference parts between the N−1 second audio mixing parameters of the N−1 optimized listening areas other than the first optimized listening area in the N optimized listening areas and the second audio mixing parameter corresponding to the first optimized listening area. The difference parameters are not the N−1 second audio mixing parameters of the N−1 optimized listening areas. The audio optimization metadata carries the difference parameters, so that a data volume of the audio optimization metadata can be reduced, and data transmission efficiency and decoding efficiency can be improved.

In a possible implementation, the second audio mixing parameter includes at least one of the following: an identifier of the first audio data, an equalization parameter, a compressor parameter, and a reverberator parameter.

In the foregoing solution, the second audio mixing parameter may include the identifier of the first audio data, for example, identifier of the M first audio data. The second audio mixing parameter may further include the equalization parameter. For example, the equalization parameter may include an equalization parameter identifier, a gain value of each frequency band, and a Q value. The second audio mixing parameter may further include the compressor parameter. For example, the compressor parameter may include a compressor identifier, a threshold, a compression ratio, a start time, a release time, and a gain compensation value. The second audio mixing parameter may further include the reverberator parameter. For example, the reverberator parameter may include a reverberation type, a reverberation time, a delay time, and a direct-to-reverberant ratio.

In a possible implementation, the audio optimization metadata further includes: N−1 difference parameters of N−1 first audio mixing parameters corresponding to the N−1 optimized listening areas other than the first optimized listening area in the N optimized listening areas with respect to the first audio mixing parameter corresponding to the first optimized listening area.

In the foregoing solution, the difference parameters are parameters of difference parts between the N−1 first audio mixing parameters of the N−1 optimized listening areas other than the first optimized listening area in the N optimized listening areas and the first audio mixing parameter corresponding to the first optimized listening area. The difference parameters are not the N−1 first audio mixing parameters of the N−1 optimized listening areas. The audio optimization metadata carries the difference parameters, so that the data volume of the audio optimization metadata can be reduced, and data transmission efficiency and decoding efficiency can be improved.

In a possible implementation, the first audio mixing parameter includes at least one of the following: an identifier of the first audio data, an equalization parameter, a compressor parameter, and a reverberator parameter.

In the foregoing solution, the first audio mixing parameter may include the identifier of the first audio data, for example, identifiers of the M pieces of first audio data. The first audio mixing parameter may further include the equalization parameter. For example, the equalization parameter may include an equalization parameter identifier, a gain value of each frequency band, and a Q value. The first audio mixing parameter may further include the compressor parameter. For example, the compressor parameter may include a compressor identifier, a threshold, a compression ratio, a start time, a release time, and a gain compensation value. The first audio mixing parameter may further include the reverberator parameter. For example, the reverberator parameter may include a reverberation type, a reverberation time, a delay time, and a direct-to-reverberant ratio.

In a possible implementation, the first metadata of the first optimized listening area includes at least one of the following: a reference coordinate system of the first optimized listening area, central location coordinates of the first optimized listening area, and a shape of the first optimized listening area.

In the foregoing solution, the metadata of the first optimized listening area may include the reference coordinate system, or the metadata of the first optimized listening area may not include the reference coordinate system. For example, the first optimized listening area uses a default coordinate system. The metadata of the first optimized listening area may include description information for describing the first optimized listening area, for example, information for describing the central location coordinates of the first optimized listening area, and the shape of the first optimized listening area. In this embodiment, there may be a plurality of shapes of the first optimized listening area. For example, the shape may be a sphere, a cube, a column, or any other shape.

In a possible implementation, the audio optimization metadata further includes: the central location coordinates of the first optimized listening area in the N optimized listening areas, and a location offset of central location coordinates of the N−1 optimized listening areas other than the first optimized listening area in the N optimized listening areas with respect to the central location coordinates of the first optimized listening area, where N is a positive integer.

In the foregoing solution, the location offset is an offset between the central location coordinates of the N−1 optimized listening areas other than the first optimized listening area in the N optimized listening areas and the central location coordinates of the first optimized listening area, rather than the central location coordinates of the N−1 optimized listening areas. The audio optimization metadata carries the location offset, so that the data volume of the audio optimization metadata can be reduced, and data transmission efficiency and decoding efficiency can be improved.

In a possible implementation, the audio optimization metadata further includes an optimized listening area change identifier, and/or a first audio mixing parameter change identifier.

The optimized listening area change identifier indicates whether the first optimized listening area changes.

The first audio mixing parameter change identifier indicates whether a first audio mixing parameter corresponding to the first audio data of the current frame changes compared with a first audio mixing parameter corresponding to the first audio data of the previous frame.

In the foregoing solution, the transmission terminal may set the first audio mixing parameter change identifier in the audio optimization metadata. The first audio mixing parameter change identifier indicates whether the first audio mixing parameter corresponding to the first audio data of the current frame changes compared with the first audio mixing parameter corresponding to the first audio data of the previous frame, so that the decoding terminal determines, based on the first audio mixing parameter change identifier, whether the first audio mixing parameter corresponding to the first optimized listening area changes. In addition, the transmission terminal may set the optimized listening area change identifier in the audio optimization metadata. The optimized listening area change identifier indicates whether an optimized listening area determined by the production terminal changes, so that the decoding terminal determines, based on the optimized listening area change identifier, whether the optimized listening area changes.

According to a third aspect, an embodiment of this application further provides an audio processing method, including:

obtaining basic audio metadata and metadata of N optimized listening areas, where N is a positive integer, and the N optimized listening areas include a first optimized listening area;

rendering M pieces of to-be-processed audio data based on the first optimized listening area and the basic audio metadata, to obtain M pieces of rendered audio data corresponding to the first optimized listening area, where M is a positive integer;

performing first audio mixing on the M pieces of rendered audio data, to obtain M pieces of first audio mixing data and a first audio mixing parameter corresponding to the first optimized listening area; and generating audio optimization metadata based on first metadata of the first optimized listening area and the first audio mixing parameter, where the audio optimization metadata includes the first metadata and the first audio mixing parameter.

In the foregoing solution, the audio optimization metadata in this embodiment includes the first metadata of the first optimized listening area and the first audio mixing parameter.

Therefore, audio optimization metadata suitable for a user to freely move to the first optimized listening area can be provided, and listening effect obtained when the user moves freely can be improved.

In a possible implementation, the method further includes: mixing the M pieces of first audio mixing data, to obtain mixed audio data corresponding to the first optimized listening area; and performing second audio mixing on the mixed audio data, to obtain second audio mixing data corresponding to the first optimized listening area and a second audio mixing parameter corresponding to the first optimized listening area; and the generating audio optimization metadata based on first metadata of the first optimized listening area and the first audio mixing parameter includes:

generating the audio optimization metadata based on the first metadata of the first optimized listening area, the first audio mixing parameter, and the second audio mixing parameter.

In the foregoing solution, when a production terminal performs audio mixing twice, the audio optimization metadata obtained by the production terminal may include the first metadata of the first optimized listening area, the first audio mixing parameter corresponding to the first optimized listening area, and the second audio mixing parameter corresponding to the first optimized listening area. After the audio optimization metadata is obtained by a decoding terminal, the decoding terminal also needs to perform audio mixing twice, and listening effect of the user can be further improved by performing the audio mixing twice.

In a possible implementation, the second audio mixing parameter includes an identifier of the second audio mixing data, an equalization parameter, a compressor parameter, and a reverberator parameter.

In the foregoing solution, the second audio mixing parameter may include the identifier of the second audio mixing data. The second audio mixing parameter may further include the equalization parameter. For example, the equalization parameter may include an equalization parameter identifier, a gain value of each frequency band, and a Q value. The second audio mixing parameter may further include the compressor parameter. For example, the compressor parameter may include a compressor identifier, a threshold, a compression ratio, a start time, a release time, and a gain compensation value. The second audio mixing parameter may further include the reverberator parameter. For example, the reverberator parameter may include a reverberation type, a reverberation time, a delay time, and a direct-to-reverberant ratio.

In a possible implementation, the first audio mixing parameter includes an identifier of the first audio mixing data, an equalization parameter, a compressor parameter, and a reverberator parameter.

In the foregoing solution, the first audio mixing parameter may include the identifier of the first audio mixing data, for example, identifiers of the M pieces of first audio mixing data. The first audio mixing parameter may further include the equalization parameter. For example, the equalization parameter may include an equalization parameter identifier, a gain value of each frequency band, and a Q value. The first audio mixing parameter may further include the compressor parameter. For example, the compressor parameter may include a compressor identifier, a threshold, a compression ratio, a start time, a release time, and a gain compensation value. The first audio mixing parameter may further include the reverberator parameter. For example, the reverberator parameter may include a reverberation type, a reverberation time, a delay time, and a direct-to-reverberant ratio.

In a possible implementation, the obtaining metadata of N optimized listening areas includes:

obtaining video image metadata and video image data, where the video image metadata includes video metadata and image metadata, and the video image data includes video data and image data;

rendering the video image data based on the video image metadata, to obtain video scene information; and obtaining the metadata of the N optimized listening areas based on the video scene information.

In the foregoing solution, the production terminal configures the N optimized listening areas based on the generated video scene information, so that the metadata of the N optimized listening areas can be generated. The video scene information is used to generate the metadata of the N optimized listening areas. Therefore, an optimized listening area that better matches a video scene can be selected.

In a possible implementation, the rendering M pieces of to-be-processed audio data based on the first optimized listening area and the basic audio metadata includes:

adjusting the basic audio metadata based on the mixed audio data corresponding to the first optimized listening area, to obtain adjusted basic audio metadata, where the mixed audio data is obtained by mixing the M pieces of first audio mixing data; and rendering the M pieces of to-be-processed audio data based on the first optimized listening area and the adjusted basic audio metadata.

In the foregoing solution, the production terminal adjusts the basic audio metadata based on the mixed audio data corresponding to the first optimized listening area, to obtain the adjusted basic audio metadata. For example, frequency responses of one or more audio signals in the audio data or parameters such as a location and a gain of an audio signal in the basic audio metadata is adjusted, so that the parameters such as the location and the gain of the audio data can be adjusted. By adjusting the basic audio metadata, listening effect of the user can be further improved.

In a possible implementation, the first metadata of the first optimized listening area includes at least one of the following: a reference coordinate system of the first optimized listening area, central location coordinates of the first optimized listening area, and a shape of the first optimized listening area.

In the foregoing solution, the metadata of the first optimized listening area may include the reference coordinate system, or the metadata of the first optimized listening area may not include the reference coordinate system. For example, the first optimized listening area uses a default coordinate system. The metadata of the first optimized listening area may include description information for describing the first optimized listening area, for example, information for describing the central location coordinates of the first optimized listening area, and the shape of the first optimized listening area. In this embodiment, there may be a plurality of shapes of the first optimized listening area. For example, the shape may be a sphere, a cube, a column, or any other shape.

According to a fourth aspect, an embodiment of this application further provides a decoding terminal, including:

a decoding module, configured to decode an audio bitstream to obtain audio optimization metadata, basic audio metadata, and M pieces of decoded audio data, where the audio optimization metadata includes first metadata of a first optimized listening area and a first decoding audio mixing parameter corresponding to the first optimized listening area, and M is a positive integer;

a rendering module, configured to render M pieces of decoded audio data based on a current location of a user and the basic audio metadata, to obtain M pieces of rendered audio data;

an audio mixing module, configured to: when the current location is in the first optimized listening area, perform first audio mixing on the M pieces of rendered audio data based on the first decoding audio mixing parameter, to obtain M pieces of first audio mixing data; and a mixing module, configured to mix the M pieces of first audio mixing data, to obtain mixed audio data corresponding to the first optimized listening area.

In the fourth aspect of this application, modules included in the decoding terminal may further perform the steps described in the first aspect and the possible implementations. For details, refer to the descriptions in the first aspect and the possible implementations.

According to a fifth aspect, an embodiment of this application further provides a transmission terminal, including:

a receiving module, configured to receive audio optimization metadata, basic audio metadata, and M pieces of first audio data, where the audio optimization metadata includes first metadata of a first optimized listening area and a first audio mixing parameter corresponding to the first optimized listening area, where M is a positive integer;

an encoding module, configured to perform compression encoding on the audio optimization metadata, the basic audio metadata, and the M pieces of first audio data, to obtain an audio bitstream; and a sending module, configured to send the audio bitstream.

In the fifth aspect of this application, modules included in the transmission terminal may further perform the steps described in the second aspect and the possible implementations of the second aspect. For details, refer to the descriptions in the second aspect and the possible implementations.

According to a sixth aspect, an embodiment of this application further provides a production terminal, including:

an obtaining module, configured to obtain basic audio metadata and metadata of N optimized listening areas, where N is a positive integer, and the N optimized listening areas include a first optimized listening area;

a rendering module, configured to render M pieces of to-be-processed audio data based on the first optimized listening area and the basic audio metadata, to obtain M pieces of rendered audio data corresponding to the first optimized listening area, where M is a positive integer;

an audio mixing module, configured to perform first audio mixing on the M pieces of rendered audio data, to obtain M pieces of first audio mixing data and a first audio mixing parameter corresponding to the first optimized listening area; and a generation module, configured to generate audio optimization metadata based on first metadata of the first optimized listening area and the first audio mixing parameter, where the audio optimization metadata includes the first metadata and the first audio mixing parameter.

In the sixth aspect of this application, modules included in the production terminal may further perform the steps described in the third aspect and the possible implementations. For details, refer to the description in the third aspect and the possible implementations.

According to a seventh aspect, an embodiment of this application provides a computer-readable storage medium. The computer-readable storage medium stores instructions. When the instructions are run on a computer, the computer is enabled to perform the methods according to the first aspect to the third aspect.

According to an eighth aspect, an embodiment of this application provides a computer program product including instructions. When the computer program product runs on a computer, the computer is enabled to perform the methods according to the first aspect to the third aspect.

According to a ninth aspect, an embodiment of this application provides a communication apparatus. The communication apparatus may include an entity such as a terminal device or a chip, and the communication apparatus includes a processor and a memory. The memory is configured to store instructions; and the processor is configured to execute the instructions in the memory, so that the communication apparatus performs the method according to any one of the first aspect to the third aspect.

According to a tenth aspect, this application provides a chip system. The chip system includes a processor, configured to support a decoding terminal, a transmission terminal, and a production terminal in implementing functions in the foregoing aspects, for example, sending or processing data and/or information in the foregoing methods. In an example embodiment, the chip system further includes a memory, and the memory is configured to store program instructions and data that are necessary for the decoding terminal, the transmission terminal, and the production terminal. The chip system may include a chip, or may include a chip and another discrete component.

According to an eleventh aspect, this application provides a device, including a receiver, configured to receive a bitstream obtained by using the method according to any implementation of the second aspect; and a memory, configured to store the bitstream received by the receiver.

According to a twelfth aspect, this application provides a computer-readable storage medium. The computer-readable storage medium stores a bitstream obtained by using the method according to any implementation of the second aspect.

According to the foregoing technical solutions, it can be learned that embodiments of this application have the following advantages.

In an embodiment of this application, an audio bitstream is decoded to obtain audio optimization metadata, basic audio metadata, and M pieces of decoded audio data, where the audio optimization metadata includes first metadata of a first optimized listening area and a first decoding audio mixing parameter corresponding to the first optimized listening area, and M is a positive integer. M pieces of decoded audio data are rendered based on a current location of a user and the basic audio metadata, to obtain M pieces of rendered audio data. When the current location of the user is in the first optimized listening area, first audio mixing is performed on the M pieces of rendered audio data based on the first decoding audio mixing parameter, to obtain M pieces of first audio mixing data. The M pieces of first audio mixing data are mixed, to obtain mixed audio data corresponding to the first optimized listening area. In this embodiment, the metadata of the first optimized listening area and the first decoding audio mixing parameter corresponding to the first optimized listening area may be obtained, and the M pieces of decoded audio data are rendered based on the current location of the user and the basic audio metadata, to obtain the M pieces of rendered audio data. Then, when it is determined that the current location of the user is in the first optimized listening area, first audio mixing is performed on the M pieces of rendered audio data based on the first decoding audio mixing parameter, to obtain the M pieces of first audio mixing data. Finally, the M pieces of first audio mixing data are mixed, to obtain the mixed audio data corresponding to the first optimized listening area. Therefore, in this embodiment, when the current location of the user is located in the first optimized listening area, both audio mixing and data mixing are implemented by using audio data corresponding to the first optimized listening area, so that audio optimization metadata suitable for the user to freely move to the first optimized listening area can be provided, and listening effect obtained when the user moves freely can be improved.

In another embodiment of this application, audio optimization metadata, basic audio metadata, and M pieces of first audio data are received, where the audio optimization metadata includes first metadata of a first optimized listening area and a first audio mixing parameter corresponding to the first optimized listening area, and M is a positive integer. Compression encoding is performed on the audio optimization metadata, the basic audio metadata, and the M pieces of first audio data, to obtain an audio bitstream. The audio bitstream is sent. In this embodiment, the audio optimization metadata, the basic audio metadata, and the M pieces of first audio data are first received, and the audio optimization metadata includes the metadata of the first optimized listening area and the first audio mixing parameter of the first optimized listening area. Therefore, audio optimization metadata suitable for a user to freely move to the first optimized listening area can be provided, and listening effect obtained when the user moves freely can be improved.

In still another embodiment of this application, basic audio metadata and metadata of N optimized listening areas are obtained, where N is a positive integer, and the N optimized listening areas include a first optimized listening area. M pieces of to-be-processed audio data are rendered based on the first optimized listening area and the basic audio metadata, to obtain M pieces of rendered audio data corresponding to the first optimized listening area, where M is a positive integer. First audio mixing is performed on the M pieces of rendered audio data, to obtain M pieces of first audio mixing data and a first audio mixing parameter corresponding to the first optimized listening area. Audio optimization metadata is generated based on first metadata of the first optimized listening area and the first audio mixing parameter, where the audio optimization metadata includes the first metadata and the first audio mixing parameter. In this embodiment, the audio optimization metadata includes the first metadata of the first optimized listening area and the first audio mixing parameter. Therefore, audio optimization metadata suitable for a user to freely move to the first optimized listening area can be provided, and listening effect obtained when the user moves freely can be improved.

BRIEF DESCRIPTION OF DRAWINGS

FIG. 2A and FIG. 2B are an example schematic flowchart of interaction among a production terminal, a transmission terminal, and a decoding terminal according to an embodiment of this application;

DESCRIPTION OF EMBODIMENTS

Figure 1:
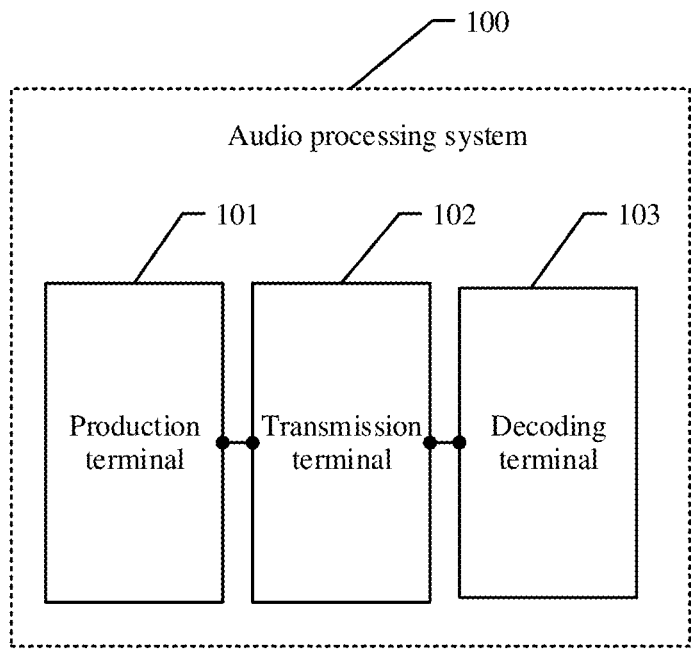
FIG. 1 is a schematic diagram of a composition structure of an example audio processing system according to an embodiment of this application.

Embodiments of this application provide an audio processing method and a terminal, to improve listening effect obtained when a user moves freely.

The following describes embodiments of this application with reference to accompanying drawings.

In the specification, claims, and the accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include" and "have" and any variations thereof are intended to cover non-exclusive inclusion, so that a process, method, system, product, or device that includes a series of units is not necessarily limited to those units, but may include other units not explicitly listed or inherent to such a process, method, system, product, or device.

A production process of a music work includes the following steps: lyric composition, arrangement, recording, audio mixing, master tape, and the like. Audio mixing is an essential step in music production, and quality of audio mixing determines success or failure of the music work.

Audio mixing is integration of sounds from a plurality of sources, which may be a violin sound, a drum sound, a human sound, or another recorded sound, into a single, stereo, or multi-channel track. In the process of audio mixing, a frequency, dynamics, sound quality, positioning and a sound field of each original signal need to be adjusted separately to optimize a signal of each audio track. Finally, a frequency and dynamics of a mixed signal are adjusted to optimize auditory effect of the mixed signal. A mixer includes an equalizer, a compressor, a reverberator, and the like. Audio mixing enables an audience to hear delicate and layered music effect that cannot be heard during live recording, making the music more expressive.

With development in fields of virtual reality (VR), augmented reality (AR), and mixed reality (MR), a virtual reality technology is also gradually applied to the music field. Various VR music scenes emerge, such as a VR music MV scene, a VR concert live scene, and a VR music variety show. Compared with traditional music, these VR music scenes combine 3D space music effect and VR visual experience, which are more live and immersive, greatly enhancing a user's music experience. In most current VR music scenes, music effect in a 3DoF scene supports only head rotation effect of the user, but does not support a six-degree-of-freedom (6DoF) scene.

A VR hardware device is increasingly mature. In addition, the user has higher requirements on music experience. Therefore, a VR music scene that supports 6DoF will be a trend in the future music field. In a traditional music creation manner, it is usually assumed that the user is in a dessert location and the user's location is unchanged during audio mixing of a production end. Audio mixing is completed before a music signal is transmitted, and the transmitted music signal is a mixed signal obtained through audio mixing. At a user end (in other words, an audio decoder end), an audio renderer only needs to adapt a playing device of the user, so that the user can experience perfect music effect. In a VR music scene that supports 6DoF, the user can move freely in the scene. A violin sound source is used as an example. A volume, timbre, and reverberation of the violin sound heard by the user at a position 3 meters (m) away from a violin and at a position 0.5 meters away from the violin vary greatly. Because a location of the user keeps changing, an actual location of the user cannot be determined during audio mixing. Therefore, the traditional music production manner cannot ensure that the user can hear the perfect music effect when the user moves freely, and user experience in the VR music scene that supports 6DoF may be greatly affected.

According to embodiments of this application, listening effect obtained when the user moves freely can be improved. For example, when the user moves freely in a virtual reality scene or an augmented reality scene, listening effect of the user can be improved. The following describes in detail embodiments of this application. As shown in FIG. 1, an embodiment of this application provides an example audio processing system 100, including a production terminal 101, a transmission terminal 102, and a decoding terminal 103. The production terminal 101 can select one or more optimized listening areas from a virtual scene. The optimized listening area may also be referred to as a "sweet spot", and the optimized listening area is a listening area preselected from the virtual scene. The production terminal 101 configures audio optimization metadata for each optimized listening area, to be specific, may generate a corresponding set of audio mixing parameters for each optimized listening area, so as to ensure that a listener can hear music effect of a music signal obtained through audio mixing in the optimized listening area. In this way, music experience of the user in a 6DoF music scene is improved.

The production terminal 101 may communicate with the transmission terminal 102, the transmission terminal 102 may communicate with the decoding terminal 103, the transmission terminal 102 may receive the audio optimization metadata of each optimized listening area from the production terminal 101, and the transmission terminal 102 performs compression encoding on the audio optimization metadata, to obtain an audio bitstream. The transmission terminal 102 may send the audio bitstream to the decoding terminal 103. The decoding terminal 103 may obtain the audio optimization metadata of each optimized listening area, and the decoding terminal 103 selects, based on a current location of the user, an optimized listening area matching the current location (for example, the matched optimized listening area is referred to as a first optimized listening area). Then, audio mixing is performed by using a first decoding audio mixing parameter corresponding to the first optimized listening area, so that the user hears the music effect of the music signal obtained through audio mixing, thereby improving music experience of the user in the 6DoF music scene.

In this embodiment, the production terminal may include 6DoF audio VR music software, a 3D audio engine, and the like. The production terminal may be used in a VR terminal device, a chip, and a wireless network device.

The transmission terminal may be used in a terminal device that requires audio communication, or a wireless device and a core network device that requires transcoding. For example, the transmission terminal may be an audio encoder of the terminal device, the wireless device, or the core network device. For example, the audio encoder may include a radio access network, a media gateway in a core network, a transcoding device, a media resource server, a mobile terminal, a fixed network terminal, and the like. Alternatively, the audio encoder may be an audio encoder applied to a streaming media service in a virtual reality technology.

Similarly, the decoding terminal may be used in a terminal device that requires audio communication, or a wireless device and a core network device that requires transcoding. For example, the decoding terminal may be an audio decoder of the terminal device, the wireless device, or the core network device.

Figure 2A:
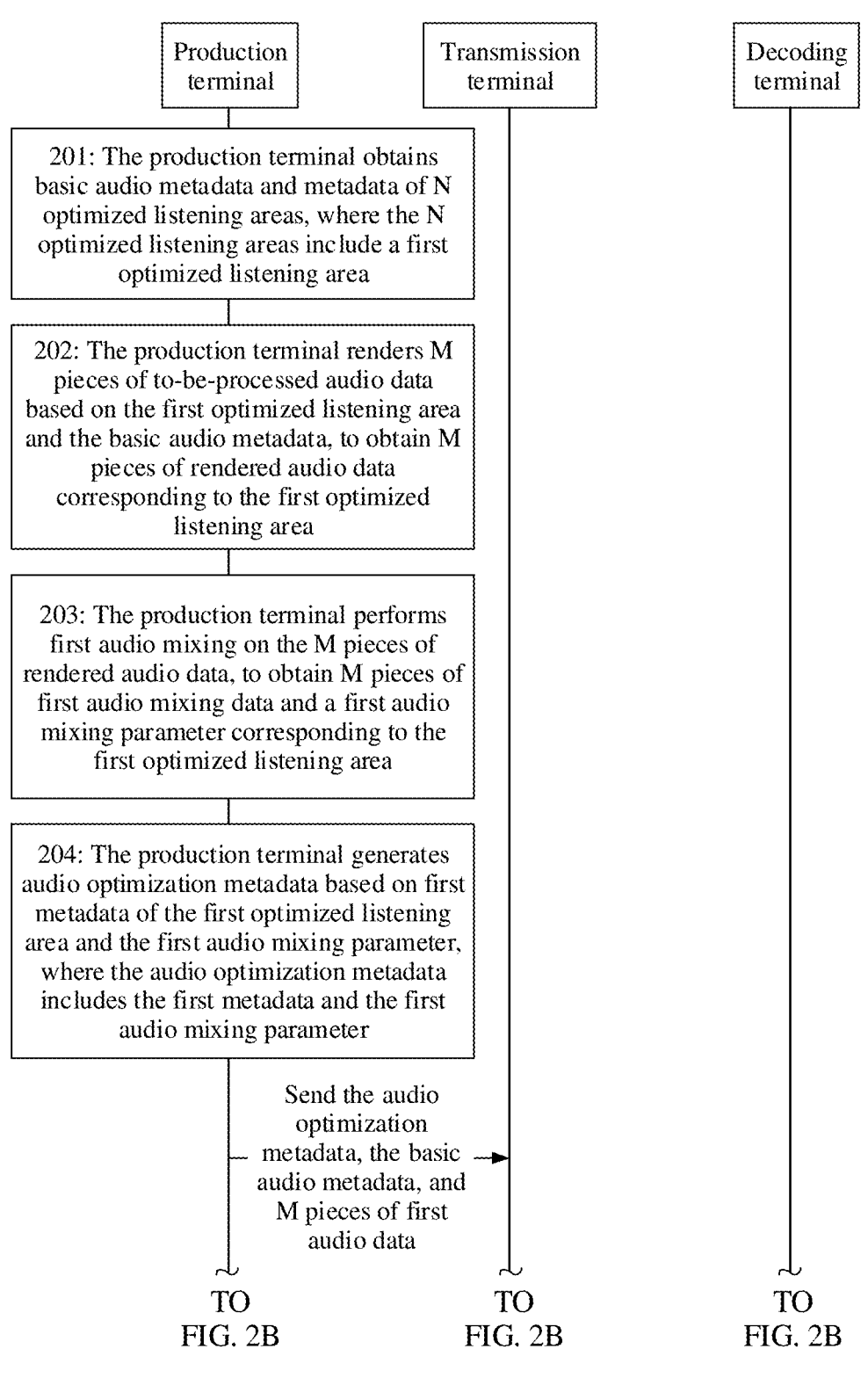

An audio processing method provided in an embodiment of this application is first described. The audio processing method is implemented based on the audio processing system in FIG. 1. FIG. 2A and FIG. 2B are an example schematic flowchart of interaction among a production terminal, a transmission terminal, and a decoding terminal according to an embodiment of this application. The production terminal may communicate with the transmission terminal, and the transmission terminal may communicate with the decoding terminal. The production terminal performs the following steps 201 to 204, the transmission terminal performs the following steps 205 to 207, and the decoding terminal performs the following steps 208 to 211.

201: The production terminal obtains basic audio metadata and metadata of N optimized listening areas, where N is a positive integer, and the N optimized listening areas include a first optimized listening area.

The basic audio metadata is basic metadata required when a VR music scene is created, and components and content of the basic audio metadata are not limited. For example, as shown in Table 1, the basic audio metadata includes at least one of the following: sound source metadata, physical model metadata, acoustic metadata, moving object metadata, interaction metadata, and resource metadata.

TABLE 1

| is a composition structure table of the basic audio metadata | |
| --- | --- |
| Sound source metadata | Object audio metadata |
| | Multi-channel audio metadata |
| | Scene audio metadata |
| Physical model metadata | Cube model |
| | Cylinder model |
| | Sphere model |
| | Triangular mesh model |
| Acoustic metadata | Acoustic material metadata |
| | Acoustic environment metadata |
| Moving object metadata | Mobile sound source metadata |
| | Moving object metadata |
| Interaction metadata | Interaction metadata between a user and a scene |
| Resource metadata | Audio resource metadata |

Specifically, the sound source metadata is used to describe an attribute of a sound source. For example, the sound source metadata may include the object audio metadata, the multi-channel audio metadata, and the scene audio metadata. The object audio metadata and the multi-channel audio metadata include information such as a reference coordinate system, a location, a gain, a volume, a shape, a directivity, an attenuation mode, and play control of a sound source. The scene audio metadata includes a location and a reference coordinate system of a scene microphone, a gain of scene audio, an effective area, a playing supported degree of freedom type (0/3/6 DoF), an attenuation mode, and play control.

The physical model metadata includes the sphere model, a columnar model, the cube model, a triangle mesh model, and the like. The sphere model, the columnar model, and the cube model are used to describe a shape of an object in a virtual room, and the like. The triangular mesh model can be used to describe rooms of arbitrary shapes and irregular objects in a scene.

The acoustic metadata includes the acoustic material metadata and the acoustic environment metadata. The acoustic material metadata is used to describe an acoustic characteristic of an object and a room surface material in a scene, and the acoustic environment metadata is used to describe reverberation information of a room in a VR scene, and the like.

The moving object metadata is used to describe motion information of a sound source, an object, and the like in a scene. The interaction metadata is used to describe interaction behaviors between a user and a VR scene.

The resource metadata is used to describe resource information and the like required in a VR scene.

Metadata used in most VR music scenes may be specifically covered by the metadata in the foregoing Table 1.

In addition, in this embodiment, in addition to obtaining the basic audio metadata, the production terminal may further obtain the N optimized listening areas from a virtual scene. A value of N is not limited. For example, N may be equal to 1, or N is greater than 1. The production terminal obtains the metadata of the N optimized listening areas. Metadata of an optimized listening area includes a configuration parameter of the optimized listening area. For example, the configuration parameter may be a parameter such as a size, a shape, or a central location of the listening area. The configuration parameter included in the metadata of the optimized listening area is not limited.

For example, the N optimized listening areas may cover different locations of the user, the N optimized listening areas include the first optimized listening area, and the first optimized listening area may refer to an optimized listening area that matches a current location of the user.

In some embodiments of this application, the first optimized listening area may be any optimized listening area of the N optimized listening areas. First metadata of the first optimized listening area includes at least one of the following: a reference coordinate system of the first optimized listening area, central location coordinates of the first optimized listening area, and a shape of the first optimized listening area.

Specifically, the metadata of the first optimized listening area may include the reference coordinate system, or the metadata of the first optimized listening area may not include the reference coordinate system. For example, the first optimized listening area uses a default coordinate system.

The metadata of the first optimized listening area may include description information for describing the first optimized listening area, for example, information for describing the central location coordinates of the first optimized listening area, and the shape of the first optimized listening area. In this embodiment, there may be a plurality of shapes of the first optimized listening area. For example, the shape may be a sphere, a cube, a column, or any other shape.

In some embodiments of this application, that the production terminal obtains metadata of N optimized listening areas in step 201 includes the following steps.

A1: The production terminal obtains video image metadata and video image data, where the video image metadata includes video metadata and image metadata, and the video image data includes video data and image data.

The production terminal may further obtain the video image metadata and the video image data in the virtual scene. The video image metadata may also be referred to as video and image metadata, and the video image data may also be referred to as video and image data. The video image data includes data content of a video and an image, and the video image metadata is information used to describe attributes of video and image contents.

A2: The production terminal renders the video image data based on the video image metadata, to obtain video scene information.

The production terminal performs video scene rendering on the video image data by using the video image metadata, to obtain the video scene information. For example, the video scene may be a virtual scene.

A3: The production terminal obtains the metadata of the N optimized listening areas based on the video scene information.

The production terminal configures the N optimized listening areas based on the generated video scene information, so that the metadata of the N optimized listening areas can be generated. The video scene information is used to generate the metadata of the N optimized listening areas. Therefore, an optimized listening area that better matches the video scene can be selected.

202: The production terminal renders M pieces of to-be-processed audio data based on the first optimized listening area and the basic audio metadata, to obtain M pieces of rendered audio data corresponding to the first optimized listening area, where M is a positive integer.

The production terminal obtains M pieces of to-be-processed first audio data. The M pieces of to-be-processed first audio data are audio data that needs to be sent to the decoding terminal. A value of M is not limited. For example, M may be equal to 1, or M is greater than 1.

After obtaining the M pieces of to-be-processed audio data, the production terminal renders each optimized listening area, to obtain rendered audio data corresponding to each optimized listening area. For example, the production terminal renders the M pieces of to-be-processed audio data based on the first optimized listening area in the N optimized listening areas and the basic audio metadata, to obtain the M pieces of rendered audio data corresponding to the first optimized listening area in the N optimized listening areas.

It should be noted that second audio data obtained through rendering may be a single-channel signal, or may be a binaural rendering signal. The N optimized listening areas have a total of N*M pieces of second audio data obtained through rendering, and * indicates a multiplication operation symbol.

It should be noted that in addition to the first optimized listening area, the N optimized listening areas may further include a second optimized listening area. The method provided in this embodiment may further include the following steps.

The production terminal renders the M pieces of to-be-processed audio data based on the second optimized listening area and the basic audio metadata, to obtain M pieces of rendered audio data corresponding to the second optimized listening area, where M is a positive integer.

Rendering performed by the production terminal based on the second optimized listening area is similar to rendering performed based on the first optimized listening area in step 201. Similarly, subsequent step 203 and step 204 are also processing performed on the first optimized listening area, and processing similar to that in step 203 and step 204 may also be performed on the second optimized listening area.

203: The production terminal performs first audio mixing on the M pieces of rendered audio data, to obtain M pieces of first audio mixing data and a first audio mixing parameter corresponding to the first optimized listening area.

After obtaining the M pieces of rendered audio data corresponding to the first optimized listening area, the production terminal may further perform, for the first optimized listening area, first audio mixing on the M pieces of rendered audio data corresponding to the first optimized listening area, to obtain the M pieces of first audio mixing data and the first audio mixing parameter corresponding to the first optimized listening area. The first audio mixing parameter is used to record an audio mixing parameter used during first audio mixing, and the audio mixing parameter may also be referred to as "audio mixing metadata". The foregoing audio mixing step may be completed by a VR music scene production terminal or by an audio mixing terminal. This is not limited herein.

It should be noted that the M pieces of first audio mixing data in step 203 are audio data obtained by the production terminal by performing first audio mixing. The M pieces of first audio mixing data and M pieces of first audio mixing data obtained by performing first audio mixing subsequently by the decoding terminal are different audio data.

In some embodiments of this application, the first audio mixing parameter includes at least one of the following: an identifier of the first audio mixing data, an equalization parameter, a compressor parameter, and a reverberator parameter.

The first audio mixing parameter may include the identifier of the first audio mixing data, for example, identifiers of the M pieces of first audio mixing data. The first audio mixing parameter may further include the equalization parameter. For example, the equalization parameter may include an equalization parameter identifier, a gain value of each frequency band, and a Q value. The Q value is a parameter of an equalization filter, represents a quality factor of the equalization filter, and may be used to describe bandwidth of the equalization filter. The first audio mixing parameter may further include the compressor parameter. For example, the compressor parameter may include a compressor identifier, a threshold, a compression ratio, a start time, a release time, and a gain compensation value. The first audio mixing parameter may further include the reverberator parameter. For example, the reverberator parameter may include a reverberation type, a reverberation time, a delay time, and a direct-to-reverberant ratio.

204: The production terminal generates audio optimization metadata based on the first metadata of the first optimized listening area and the first audio mixing parameter, where the audio optimization metadata includes the first metadata and the first audio mixing parameter.

After obtaining the first audio mixing parameter corresponding to the first optimized listening area, the production terminal may generate the audio optimization metadata for the first optimized listening area. The audio optimization metadata is different from the foregoing basic audio metadata, and the audio optimization metadata includes: the first metadata of the first optimized listening area, and the first audio mixing parameter corresponding to the first optimized listening area. The audio optimization metadata is used to optimize a music signal heard by the user whose current location is in the first optimized listening area, to improve music effect of the music signal.

In some embodiments of this application, the audio processing method that may be performed by the production terminal further includes the following steps:

B1: The production terminal mixes the M pieces of first audio mixing data, to obtain mixed audio data corresponding to the first optimized listening area.

B2: Perform second audio mixing on the mixed audio data, to obtain second audio mixing data corresponding to the first optimized listening area and a second audio mixing parameter corresponding to the first optimized listening area.

Specifically, after the production terminal performs first audio mixing in step 203, to further improve audio mixing effect of the audio data, the production terminal may further perform steps B1 and B2. For the first optimized listening area, the production terminal may mix the M pieces of first audio mixing data, to obtain the mixed audio data corresponding to the first optimized listening area. Then, the production terminal may perform second audio mixing on the mixed audio data, to obtain the second audio mixing data corresponding to the first optimized listening area and the second audio mixing parameter corresponding to the first optimized listening area. The foregoing audio mixing step may be completed by the VR music scene production terminal or by the audio mixing terminal. This is not limited herein.

In an implementation scenario of performing steps B1 and B2, that the production terminal generates audio optimization metadata based on the first metadata of the first optimized listening area and the first audio mixing parameter in step 204 includes:

The production terminal generates the audio optimization metadata based on the first metadata, the first audio mixing parameter, and the second audio mixing parameter.

When the production terminal performs audio mixing twice, the audio optimization metadata obtained by the production terminal may include the first metadata of the first optimized listening area, the first audio mixing parameter corresponding to the first optimized listening area, and the second audio mixing parameter corresponding to the first optimized listening area. After the audio optimization metadata is obtained by the decoding terminal, the decoding terminal also needs to perform audio mixing twice, and listening effect of the user can be further improved by performing the audio mixing twice.

In some embodiments of this application, the second audio mixing parameter includes an identifier of the second audio mixing data, an equalization parameter, a compressor parameter, and a reverberator parameter.

The second audio mixing parameter may include the identifier of the second audio mixing data. The second audio mixing parameter may further include the equalization parameter. For example, the equalization parameter may include an equalization parameter identifier, a gain value of each frequency band, and a Q value. The second audio mixing parameter may further include the compressor parameter. For example, the compressor parameter may include a compressor identifier, a threshold, a compression ratio, a start time, a release time, and a gain compensation value. The second audio mixing parameter may further include the reverberator parameter. For example, the reverberator parameter may include a reverberation type, a reverberation time, a delay time, and a direct-to-reverberant ratio.

In some embodiments of this application, the audio processing method that may be performed by the production terminal further includes the following step:

C1: The production terminal sends M pieces of first audio data, the basic audio metadata, and the audio optimization metadata to the transmission terminal.

The production terminal sends the M pieces of first audio data, the basic audio metadata, and the audio optimization metadata together to the transmission terminal, or the production terminal may send the M pieces of first audio data, the basic audio metadata, and the audio optimization metadata separately to the transmission terminal. A specific sending manner is not limited herein. The transmission terminal may further send the M pieces of first audio data, the basic audio metadata, and the audio optimization metadata to the decoding terminal, and the decoding terminal receives the M pieces of first audio data, the basic audio metadata, and the audio optimization metadata.

In some embodiments of this application, the production terminal may further adjust the basic audio metadata. Specifically, M pieces of to-be-processed audio data are rendered based on the first optimized listening area and the basic audio metadata in the foregoing step 202 includes the following steps:

D1: The production terminal adjusts the basic audio metadata based on the mixed audio data corresponding to the first optimized listening area, to obtain adjusted basic audio metadata, where the mixed audio data is obtained by mixing the M pieces of first audio mixing data.

D2: The production terminal renders the M pieces of to-be-processed audio data based on the first optimized listening area and the adjusted basic audio metadata.

Specifically, in D1, for the first optimized listening area, the production terminal may mix the M pieces of first audio mixing data, to obtain the mixed audio data corresponding to the first optimized listening area. The production terminal adjusts the basic audio metadata based on the mixed audio data corresponding to the first optimized listening area, to obtain the adjusted basic audio metadata. For example, frequency responses of one or more audio signals in the audio data or parameters such as a location and a gain of an audio signal in the basic audio metadata is adjusted, so that parameters such as a location and a gain of the audio data can be adjusted, and music effect of a music signal finally heard by the user can be adjusted. In D2, the production terminal renders the M pieces of to-be-processed audio data by using the first optimized listening area and the adjusted basic audio metadata. The listening effect of the user can be further improved by adjusting the basic audio metadata.

The production terminal may obtain the audio optimization metadata by performing the foregoing step 201 to step 204, and then the production terminal sends the audio optimization metadata to the transmission terminal. The transmission terminal performs subsequent step 205 to step 207.

205: The transmission terminal receives the audio optimization metadata, the basic audio metadata, and the M pieces of first audio data, where the audio optimization metadata includes: the first metadata of the first optimized listening area and the first audio mixing parameter corresponding to the first optimized listening area, and M is a positive integer.

A generation process of the audio optimization metadata is described in detail in step 201 to step 204 performed by the production terminal. After the production terminal generates the audio optimization metadata, the production terminal may further send the audio optimization metadata to the transmission terminal, and the transmission terminal receives the audio optimization metadata from the production terminal. In addition, the production terminal may further send the basic audio metadata and the M pieces of first audio data to the transmission terminal, and the transmission terminal receives the basic audio metadata and the M pieces of first audio data from the production terminal.

206: The transmission terminal performs compression encoding on the audio optimization metadata, the basic audio metadata, and the M pieces of first audio data, to obtain an audio bitstream.

After receiving the audio optimization metadata, the basic audio metadata, and the M pieces of first audio data, the transmission terminal may perform compression encoding on the audio optimization metadata, the basic audio metadata, and the M pieces of first audio data by using a preset encoding algorithm, to obtain the audio bitstream. The used encoding algorithm is not limited in this embodiment.

207: The transmission terminal sends the audio bitstream.

The transmission terminal sends the audio bitstream by using a transmission channel between the transmission terminal and the decoding terminal.

In some embodiments of this application, the audio processing method that may be performed by the transmission terminal further includes the following steps:

E1: The transmission terminal receives the video image metadata and the video image data from the production terminal, where the video image metadata includes the video metadata and the image metadata, and the video image data includes the video data and the image data.

E2: The transmission terminal performs compression encoding on the video image metadata and the video image data to obtain a video image bitstream.

E3: The transmission terminal sends the video image bitstream to the decoding terminal.

The production terminal may further send the video image metadata and the video image data to the transmission terminal. After receiving the video image metadata and the video image data, the transmission terminal may generate the video image bitstream. The video image bitstream carries the video image metadata and the video image data. Therefore, after receiving the video image bitstream from the transmission terminal, the decoding terminal may obtain the video image metadata and the video image data.

In some embodiments of this application, the audio optimization metadata further includes a second audio mixing parameter change identifier.

The second audio mixing parameter change identifier indicates whether a second audio mixing parameter corresponding to first audio data of a current frame changes compared with a second audio mixing parameter corresponding to first audio data of a previous frame.

The transmission terminal may set the second audio mixing parameter change identifier in the audio optimization metadata. The second audio mixing parameter change identifier indicates whether the second audio mixing parameter corresponding to the first optimized listening area changes. Therefore, the decoding terminal determines, based on the second audio mixing parameter change identifier, whether the second audio mixing parameter corresponding to the first optimized listening area changes. For example, when the second audio mixing parameter corresponding to the first audio data of the current frame changes compared with the second audio mixing parameter corresponding to the first audio data of the previous frame, the second audio mixing parameter change identifier is true, and the transmission terminal may further send change information of the second audio mixing parameter corresponding to the first audio data. The decoding terminal receives the change information of the second audio mixing parameter corresponding to the first audio data, and obtains, based on the change information, a changed second audio mixing parameter corresponding to the first audio data of the current frame.

In some embodiments of this application, the audio optimization metadata further includes the second audio mixing parameter corresponding to the first optimized listening area.

When the production terminal performs audio mixing twice, the audio optimization metadata obtained by the production terminal may include the first metadata of the first optimized listening area, the first audio mixing parameter corresponding to the first optimized listening area, and the second audio mixing parameter corresponding to the first optimized listening area. After the audio optimization metadata is obtained by the decoding terminal, the decoding terminal also needs to perform audio mixing twice, and listening effect of the user can be improved by performing the audio mixing twice.

In some embodiments of this application, the audio optimization metadata includes the second audio mixing parameter corresponding to the first optimized listening area of the N optimized listening areas, and difference parameters of N−1 second audio mixing parameters of N−1 optimized listening areas other than the first optimized listening area in the N optimized listening areas with respect to the second audio mixing parameter corresponding to the first optimized listening area.

The difference parameters are parameters of difference parts between the N−1 second audio mixing parameters of the N−1 optimized listening areas other than the first optimized listening area in the N optimized listening areas and the second audio mixing parameter corresponding to the first optimized listening area. The difference parameters are not the N−1 second audio mixing parameters of the N−1 optimized listening areas. For example, the second audio mixing parameter corresponding to the first optimized listening area includes a parameter 1, a parameter 2, and a parameter 3. If a second audio mixing parameter corresponding to each of the N−1 second audio mixing parameters corresponding to the N−1 optimized listening areas includes: the parameter 1, the parameter 2, and a parameter 4, the difference parameter between the N−1 second audio mixing parameters corresponding to the N−1 optimized listening area and the second audio mixing parameter corresponding to the first optimized listening area includes the parameter 4. The audio optimization metadata carries the difference parameters, so that a data volume of the audio optimization metadata can be reduced, and data transmission efficiency and decoding efficiency can be improved.

In some embodiments of this application, the second audio mixing parameter includes an identifier of the first audio data, an equalization parameter, a compressor parameter, and a reverberator parameter.

The second audio mixing parameter may include the identifier of the first audio data, for example, identifiers of the M pieces of first audio data. The second audio mixing parameter may further include the equalization parameter. For example, the equalization parameter may include an equalization parameter identifier, a gain value of each frequency band, and a Q value. The second audio mixing parameter may further include the compressor parameter. For example, the compressor parameter may include a compressor identifier, a threshold, a compression ratio, a start time, a release time, and a gain compensation value. The second audio mixing parameter may further include the reverberator parameter. For example, the reverberator parameter may include a reverberation type, a reverberation time, a delay time, and a direct-to-reverberant ratio.

In some embodiments of this application, the audio optimization metadata further includes: N−1 difference parameters of N−1 first audio mixing parameters corresponding to the N−1 optimized listening areas other than the first optimized listening area in the N optimized listening areas with respect to the first audio mixing parameter corresponding to the first optimized listening area.

The difference parameters are parameters of difference parts between the N−1 first mixing parameters of the N−1 optimized listening areas other than the first optimized listening area in the N optimized listening areas and the first mixing parameter corresponding to the first optimized listening area. The difference parameters are not the N−1 first mixing parameters of the N−1 optimized listening areas. For example, the first audio mixing parameter corresponding to the first optimized listening area includes a parameter 1, a parameter 2, and a parameter 3. If a first audio mixing parameter corresponding to each of the N−1 first audio mixing parameters corresponding to the N−1 optimized listening areas includes: the parameter 1, the parameter 2, and a parameter 4, and the difference parameter between the N−1 first audio mixing parameters corresponding to the N−1 optimized listening area and the first audio mixing parameter corresponding to the first optimized listening area includes the parameter 4. The audio optimization metadata carries the difference parameters, so that the data volume of the audio optimization metadata can be reduced, and data transmission efficiency and decoding efficiency can be improved.

In some embodiments of this application, the first audio mixing parameter includes an identifier of the first audio data, an equalization parameter, a compressor parameter, and a reverberator parameter.

The first audio mixing parameter may include the identifier of the first audio data, for example, identifiers of the M pieces of first audio data. The first audio mixing parameter may further include the equalization parameter. For example, the equalization parameter may include an equalization parameter identifier, a gain value of each frequency band, and a Q value. The first audio mixing parameter may further include the compressor parameter. For example, the compressor parameter may include a compressor identifier, a threshold, a compression ratio, a start time, a release time, and a gain compensation value. The first audio mixing parameter may further include the reverberator parameter. For example, the reverberator parameter may include a reverberation type, a reverberation time, a delay time, and a direct-to-reverberant ratio.

In some embodiments of this application, the metadata of the first optimized listening area includes at least one of the following: a reference coordinate system of the first optimized listening area, central location coordinates of the first optimized listening area, and a shape of the first optimized listening area.

Specifically, the metadata of the first optimized listening area may include the reference coordinate system, or the metadata of the first optimized listening area may not include the reference coordinate system. For example, the first optimized listening area uses a default coordinate system.

The metadata of the first optimized listening area may include description information for describing the first optimized listening area, for example, information for describing the central location coordinates of the first optimized listening area, and the shape of the first optimized listening area. In this embodiment, there may be a plurality of shapes of the first optimized listening area. For example, the shape may be a sphere, a cube, a column, or any other shape.

In some embodiments of this application, the audio optimization metadata further includes: the central location coordinates of the first optimized listening area in the N optimized listening areas, and a location offset of central location coordinates of the N−1 optimized listening areas other than the first optimized listening area in the N optimized listening areas with respect to the central location coordinates of the first optimized listening area.

The location offset is an offset between the central location coordinates of the N−1 optimized listening areas other than the first optimized listening area in the N optimized listening areas and the central location coordinates of the first optimized listening area, rather than the central location coordinates of the N−1 optimized listening areas. The audio optimization metadata carries the location offset, so that the data volume of the audio optimization metadata can be reduced, and data transmission efficiency and decoding efficiency can be improved.

In some embodiments of this application, the audio optimization metadata further includes an optimized listening area change identifier and/or a first audio mixing parameter change identifier The optimized listening area change identifier indicates whether the first optimized listening area changes.

The first audio mixing parameter change identifier indicates whether a first audio mixing parameter corresponding to the first audio data of the current frame changes compared with a first audio mixing parameter corresponding to the first audio data of the previous frame.

The transmission terminal may set the first audio mixing parameter change identifier in the audio optimization metadata. The first audio mixing parameter change identifier indicates whether the first audio mixing parameter corresponding to the first audio data of the current frame changes compared with the first audio mixing parameter corresponding to the first audio data of the previous frame, so that the decoding terminal determines, based on the first audio mixing parameter change identifier, whether the first audio mixing parameter corresponding to the first optimized listening area changes. In addition, the transmission terminal may set the optimized listening area change identifier in the audio optimization metadata. The optimized listening area change identifier indicates whether an optimized listening area determined by the production terminal changes, so that the decoding terminal determines, based on the optimized listening area change identifier, whether the optimized listening area changes. For example, the optimized listening area metadata change identifier and the first audio mixing parameter change identifier are added to an encoded 6DoF audio optimization metadata, so as to improve transmission efficiency of the 6DoF audio optimization metadata. When the VR music scene is initialized, an initial audio optimization metadata is transmitted. When the VR scene changes and location and shape information of the optimized listening area changes, the optimized listening area change identifier is true, and change information of the optimized listening area is transmitted. When a first audio mixing parameter of the current frame changes, the first audio mixing parameter change identifier is true, and change information of the first audio mixing parameter is transmitted.

The transmission terminal performs the foregoing step 205 to step 207, and the decoding terminal performs subsequent steps 208 to 211. It may be understood that an audio processing process performed by the decoding terminal is similar to an audio processing process performed by the production terminal. The following describes the audio processing process performed by the decoding terminal.

208: The decoding terminal decodes the audio bitstream to obtain the audio optimization metadata, the basic audio metadata, and the M pieces of decoded audio data, where the audio optimization metadata includes the first metadata of the first optimized listening area and the first decoding audio mixing parameter corresponding to the first optimized listening area, and M is a positive integer.

A generation process of the audio bitstream is described in detail in step 205 to step 207 performed by the transmission terminal. The transmission terminal sends the audio bitstream to the decoding terminal, and the decoding terminal receives the audio bitstream from the transmission terminal, to obtain M pieces of decoded audio data, the audio optimization metadata, and the basic audio metadata. The M pieces of decoded audio data are corresponding to the M pieces of to-be-processed audio data on the production terminal side. For descriptions of the M pieces of decoded audio data, the audio optimization metadata, and the basic audio metadata, refer to the foregoing embodiment.

209: The decoding terminal renders the M pieces of decoded audio data based on the current location of the user and the basic audio metadata, to obtain the M pieces of rendered audio data.

After the decoding terminal obtains the M pieces of decoded audio data, the audio optimization metadata, and the basic audio metadata, the decoding terminal renders the M pieces of decoded audio data based on the current location of the user and the basic audio metadata, to obtain the M pieces of rendered audio data.

It should be noted that the M pieces of rendered audio data in step 209 are audio data obtained by the decoding terminal by performing rendering. The M pieces of rendered audio data and the M pieces of rendered audio data obtained by performing rendering by the production terminal are different audio data.

210: When the current location of the user is in the first optimized listening area, the decoding terminal performs first audio mixing on the M pieces of rendered audio data based on the first decoding audio mixing parameter, to obtain the M pieces of first audio mixing data.

The decoding terminal obtains, from the N optimized listening areas based on the current location of the user, an optimized listening area that matches the current location, and the optimized listening area that matches the current location is referred to as the first optimized listening area. In step 208, the decoding terminal obtains the audio optimization metadata, and the audio optimization metadata includes the first decoding audio mixing parameter corresponding to the first optimized listening area. Therefore, the first decoding audio mixing parameter corresponding to the first optimized listening area may be obtained from the audio optimization metadata. The decoding terminal performs first audio mixing on the M pieces of rendered audio data based on the first decoding audio mixing parameter corresponding to the first optimized listening area, to obtain the M pieces of first audio mixing data corresponding to the first optimized listening area. The first decoding audio mixing parameter is corresponding to the first audio mixing parameter on the production terminal side, and the first audio mixing parameter is used to record an audio mixing parameter used when the production terminal performs first audio mixing. The foregoing audio mixing step may be completed by the VR music scene production terminal or by the audio mixing terminal. This is not limited herein.

211: The decoding terminal mixes the M pieces of first audio mixing data, to obtain the mixed audio data corresponding to the first optimized listening area.

After obtaining the M pieces of first audio mixing data corresponding to the first optimized listening area, the decoding terminal mixes the M pieces of first audio mixing data corresponding to the first optimized listening area, to obtain the mixed audio data corresponding to the first optimized listening area. Because the first optimized listening area is an optimized listening area that includes the current location of the user, the decoding terminal mixes the M pieces of first audio mixing data corresponding to the first optimized listening area to obtain the mixed audio data corresponding to the first optimized listening area. The first optimized listening area can be adapted to an actual location of the user. Therefore, audio optimization metadata suitable for the user to freely move to the first optimized listening area can be provided, and listening effect obtained when the user moves freely can be improved.

It should be noted that the mixed audio data may be directly used for playing, and when the mixed audio data is played, the listening effect of the user can be improved.

In some embodiments of this application, the audio optimization metadata further includes a second decoding audio mixing parameter corresponding to the first optimized listening area.

The second decoding audio mixing parameter is corresponding to the second audio mixing parameter on the production terminal side, and the second audio mixing parameter is used to record an audio mixing parameter used during second audio mixing.

The audio processing method that may be performed by the decoding terminal further includes the following steps.

F1: The decoding terminal performs second audio mixing on the mixed audio data based on the second decoding audio mixing parameter, to obtain the second audio mixing data corresponding to the first optimized listening area.

After obtaining the second decoding audio mixing parameter, the decoding terminal may further perform second audio mixing on the mixed audio data based on the second decoding audio mixing parameter, to obtain the second audio mixing data corresponding to the first optimized listening area. The second audio mixing data can be obtained through the second audio mixing. When the second audio mixing data is played, listening effect of the user can be improved.

The audio mixing step may be completed by the VR music scene production terminal or by the audio mixing terminal. This is not limited herein.

When the production terminal performs audio mixing twice, the audio optimization metadata obtained by the production terminal may include the first metadata of the first optimized listening area, the first audio mixing parameter corresponding to the first optimized listening area, and the second audio mixing parameter corresponding to the first optimized listening area. After the audio optimization metadata is obtained by the decoding terminal, the decoding terminal also needs to perform audio mixing twice, and the listening effect of the user can be improved by performing the audio mixing twice.

In some embodiments of this application, the second decoding audio mixing parameter includes an identifier of the second audio mixing data, an equalization parameter, a compressor parameter, and a reverberator parameter.

The second decoding audio mixing parameter may include the identifier of the second audio mixing data. The second decoding audio mixing parameter may further include the equalization parameter. For example, the equalization parameter may include an equalization parameter identifier, a gain value of each frequency band, and a Q value. The second decoding audio mixing parameter may further include the compressor parameter. For example, the compressor parameter may include a compressor identifier, a threshold, a compression ratio, a start time, a release time, and a gain compensation value. The second decoding audio mixing parameter may further include the reverberator parameter. For example, the reverberator parameter may include a reverberation type, a reverberation time, a delay time, and a direct-to-reverberant ratio.

In some embodiments of this application, the audio optimization metadata further includes: N−1 difference parameters of N−1 second decoding audio mixing parameters corresponding to the N−1 optimized listening areas other than the first optimized listening area in the N optimized listening areas with respect to the second decoding audio mixing parameter corresponding to the first optimized listening area, where N is a positive integer.

The difference parameters are parameters of difference parts between the N−1 second decoding audio mixing parameters of the N−1 optimized listening areas other than the first optimized listening area in the N optimized listening areas and the second decoding audio mixing parameter corresponding to the first optimized listening area. The difference parameters are not the N−1 second decoding audio mixing parameters of the N−1 optimized listening areas. For example, the second decoding audio mixing parameter corresponding to the first optimized listening area includes a parameter 1, a parameter 2, and a parameter 3. If a second decoding audio mixing parameter corresponding to each of the N−1 second decoding audio mixing parameters corresponding to the N−1 optimized listening areas includes: the parameter 1, the parameter 2, and a parameter 4. The difference parameter between the N−1 second decoding audio mixing parameters corresponding to the N−1 optimized listening area and the second decoding audio mixing parameter corresponding to the first optimized listening area includes the parameter 4. The audio optimization metadata carries the difference parameters, so that a data volume of the audio optimization metadata can be reduced, and data transmission efficiency and decoding efficiency can be improved.

In some embodiments of this application, the first decoding audio mixing parameter includes at least one of the following: an identifier of rendered audio data, an equalization parameter, a compressor parameter, and a reverberator parameter.

The first decoding audio mixing parameter may include the identifier of the rendered audio data, for example, identifiers of the M pieces of rendered audio data. The first decoding audio mixing parameter may further include the equalization parameter. For example, the equalization parameter may include an equalization parameter identifier, a gain value of each frequency band, and a Q value. The first decoding audio mixing parameter may further include the compressor parameter. For example, the compressor parameter may include a compressor identifier, a threshold, a compression ratio, a start time, a release time, and a gain compensation value. The first decoding audio mixing parameter may further include the reverberator parameter. For example, the reverberator parameter may include a reverberation type, a reverberation time, a delay time, and a direct-to-reverberant ratio.

In some embodiments of this application, the audio optimization metadata further includes: N−1 difference parameters of N−1 first decoding audio mixing parameters corresponding to the N−1 optimized listening areas other than the first optimized listening area in the N optimized listening areas with respect to the first decoding audio mixing parameter corresponding to the first optimized listening area, where N is a positive integer.

The difference parameters are parameters of difference parts between the N−1 first decoding mixing parameters of the N−1 optimized listening areas other than the first optimized listening area in the N optimized listening areas and the first decoding mixing parameter corresponding to the first optimized listening area. The difference parameters are not the N−1 first decoding mixing parameters of the N−1 optimized listening areas. For example, the first decoding audio mixing parameter corresponding to the first optimized listening area includes a parameter 1, a parameter 2, and a parameter 3. If a first decoding audio mixing parameter corresponding to each of the N−1 first decoding audio mixing parameters corresponding to the N−1 optimized listening areas includes: the parameter 1, the parameter 2, and a parameter 4. The difference parameter between the N−1 first decoding audio mixing parameters corresponding to the N−1 optimized listening areas and the first decoding audio mixing parameter corresponding to the first optimized listening area includes the parameter 4. The audio optimization metadata carries the difference parameters, so that a data volume of the audio optimization metadata can be reduced, and data transmission efficiency and decoding efficiency can be improved.

In some embodiments of this application, the audio processing method that may be performed by the decoding terminal further includes the following steps:

G1: The decoding terminal decodes the video image bitstream to obtain decoded video image data and video image metadata, where the video image metadata includes the video metadata and the image metadata.

G2: The decoding terminal renders the decoded video image data based on the video image metadata, to obtain rendered video image data.

G3: The decoding terminal establishes a virtual scene based on the rendered video image data.

G4: The decoding terminal identifies the first optimized listening area in the virtual scene based on the rendered video image data and the audio optimization metadata.

The transmission terminal may generate the video image bitstream based on the video image metadata and the video image data, and the video image bitstream carries the video image metadata and the video image data. Therefore, after receiving the video image bitstream from the transmission terminal, the decoding terminal may obtain the video image metadata and the decoded video image data. The decoding terminal renders the decoded video image data based on the video image metadata, to obtain the rendered video image data, and the decoding terminal may establish the virtual scene by using the rendered video image data. Finally, the decoding terminal identifies the first optimized listening area in the virtual scene based on the rendered video image data and the audio optimization metadata, so that the decoding terminal side displays the first optimized listening area in the virtual scene, and guides the user to experience music in the optimized listening area, thereby improving listening effect of the user.

For example, the decoding terminal identifies the first optimized listening area in the virtual scene based on the rendered video image data and the audio optimization metadata. In a processing manner similar to that of the first optimized listening area, the decoding terminal may further identify N optimized listening areas in the virtual scene. The decoding terminal generates an audio experience route based on the N optimized listening areas identified in the virtual scene, to guide the user to better experience 6DoF music.

It can be learned from the example described in the foregoing embodiment that the decoding terminal may receive the audio optimization metadata. In this embodiment, the audio optimization metadata includes the metadata of the first optimized listening area and the first audio mixing parameter corresponding to the first optimized listening area. The first optimized listening area is determined based on the current location of the user. Therefore, the first decoding audio mixing parameter corresponding to the first optimized listening area can be obtained to perform audio mixing. Therefore, the audio optimization metadata suitable for the user to freely move to the first optimized listening area can be provided, and the listening effect obtained when the user moves freely can be improved.

To better understand and implement the foregoing solutions in embodiments of this application, specific descriptions are provided below by using corresponding application scenarios as examples.

In this embodiment, the optimized listening area may be expressed as the sweet spot. In the audio processing method in this embodiment, the production terminal selects one or more sweet spots from the VR scene. Music effect of a rendered music signal heard by the user in each sweet spot is optimized, thereby improving the user's music experience in the 6DoF music scene.

Specifically, a 6DoF virtual music scene manufacturing method is performed on the production terminal side. It is assumed that processes such as VR video scene production, audio collection, and 6DoF basic audio metadata production have been completed in the 6DoF music scene. In this embodiment, several sweet spots are selected in the VR scene, and the sweet spot should be consistent as much as possible with a listening area in which the user is interested. For each sweet spot, a rendered signal of each audio signal at a central location of the sweet spot is generated based on the audio signal and the 6DoF basic audio metadata, and then audio mixing is performed on each rendered signal to adjust a frequency, dynamics, sound quality, positioning, a sound field, and the like. An audio mixing parameter of each audio mixing step corresponding to each audio signal is reserved. Finally, audio mixing is performed on a mixed audio signal, and an audio mixing parameter of each audio mixing step corresponding to the mixed signal is reserved.

The 6DoF audio optimization metadata generated by the production terminal includes sweet spot metadata and an audio mixing parameter corresponding to each sweet spot. The sweet spot metadata includes information such as central location coordinates of each sweet spot and a shape of the sweet spot. Each piece of sweet spot metadata is corresponding to a group of audio mixing metadata, including an audio mixing parameter of an audio mixing parameter signal corresponding to a single audio signal. The production terminal sends the 6DoF audio optimization metadata to the transmission terminal, and the transmission terminal generates an audio bitstream based on the 6DoF audio optimization metadata, and sends the audio bitstream to the decoding terminal.

Optionally, a sweet spot location change identifier and an audio mixing parameter change identifier are added to the 6DoF audio optimization metadata. When the VR music scene is initialized, the initial audio optimization metadata is transmitted. When the VR scene changes and the location and shape information of the sweet spot changes, the sweet spot metadata change identifier is true, and change information of the sweet spot is transmitted. When audio mixing metadata of a current frame changes, the audio mixing parameter change identifier is true, and change information of the audio mixing metadata is transmitted.

The decoding terminal may include a video renderer and an audio renderer, and the decoding terminal may perform a 6DoF music scene audio rendering method. Specifically, the video renderer identifies the sweet spot based on decoded sweet spot metadata, and guides the user to experience the 6DoF music properly. When the current location of the user is in a sweet spot, the audio renderer renders the audio signal based on location information of the user, the 6DoF basic audio metadata, and the 6DoF audio optimization metadata, so as to provide better music experience to the user. The audio optimization metadata has a specific application range. The application range is determined based on a shape of a current sweet spot, and the shape is predetermined based on a music production scene. When the current location of the user is outside the sweet spot, the audio renderer renders the audio signal based on the location information of the user and the 6DoF basic audio metadata.

This embodiment is applicable to scene production, audio metadata transmission, and user-end audio and video rendering in VR, AR, or MR applications. The terminals in this embodiment are applied to a VR music software including 6DoF audio, a 3D audio engine, and the like. For example, the terminals may include a VR terminal device, a chip, a wireless network device, and the like.

Figure 3:
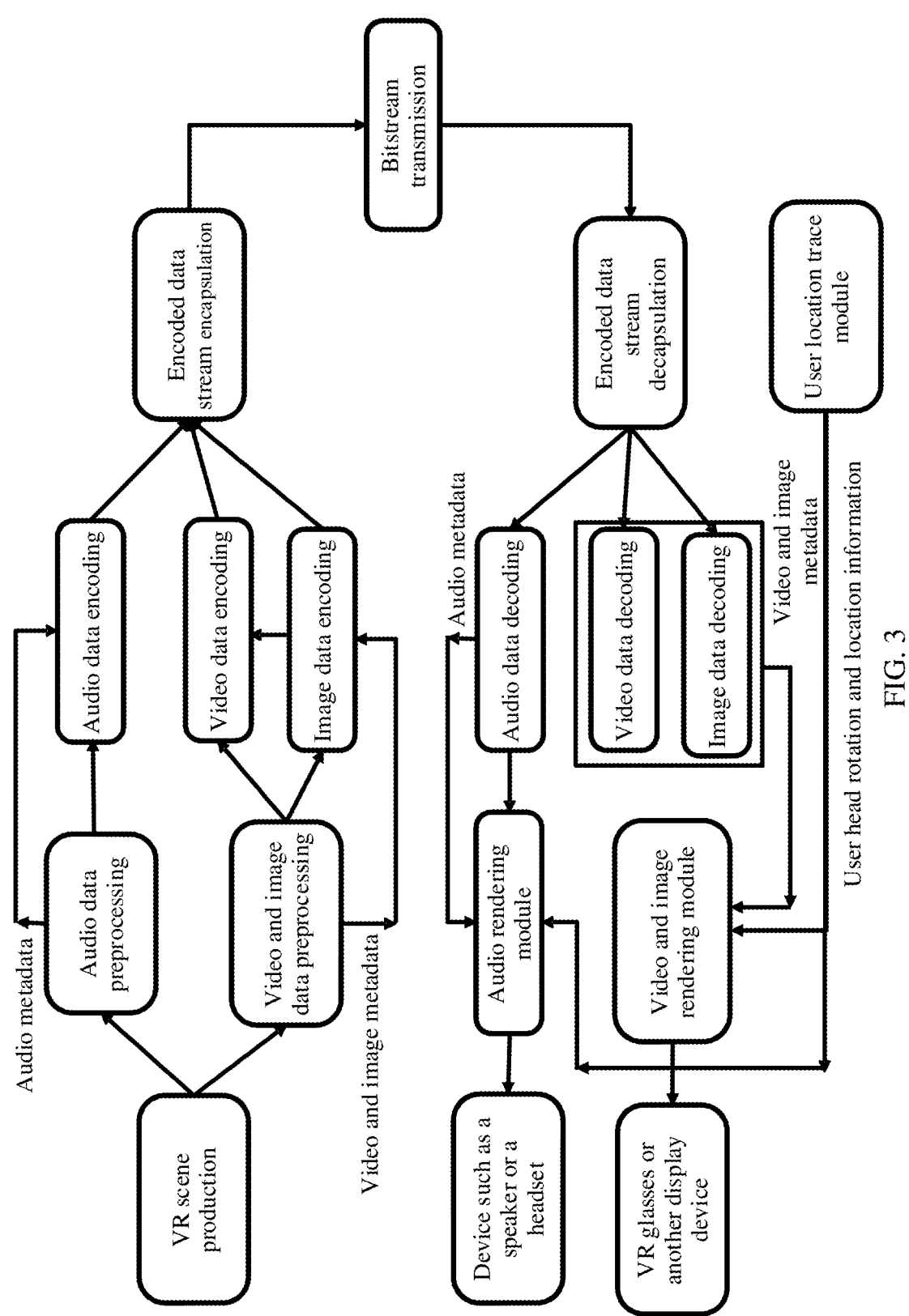
FIG. 3 is an example schematic flowchart of streaming data processing in a virtual reality streaming service system according to an embodiment of this application.

FIG. 3 is a schematic flowchart of streaming data processing in an example virtual reality streaming service system according to an embodiment of this application. This embodiment is applicable to a 6DoF audio rendering module (audio binaural rendering) in an application such as AR or VR, and is specifically applied to an audio data preprocessing module, an audio data encoding module, an audio data decoding module, and an audio rendering module in FIG. 3. An end-to-end audio signal processing process is as follows: A preprocessing (audio preprocessing) operation is performed on an audio signal after the audio signal passes through a VR scene collection or production module. The preprocessing operation includes filtering out a low-frequency component below 50 Hz in the signal and extracting 6DoF audio metadata (including 6DoF basic audio metadata, 6DoF audio optimization metadata, and the like). Then, encoding (audio encoding) and encapsulation (file/segment encapsulation) are performed on a preprocessed audio signal, and a processed signal is delivered (delivery) to a decoder side. The decoder side first performs decapsulation (file/segment decapsulation) and then performs decoding (audio decoding). Rendering (audio rendering) is performed on a decoded audio signal, and a rendered signal is mapped to a speaker or a headset device of a listener. The headset device may be an independent headset, or may be a headset on an eyeglass device.

Figure 4:
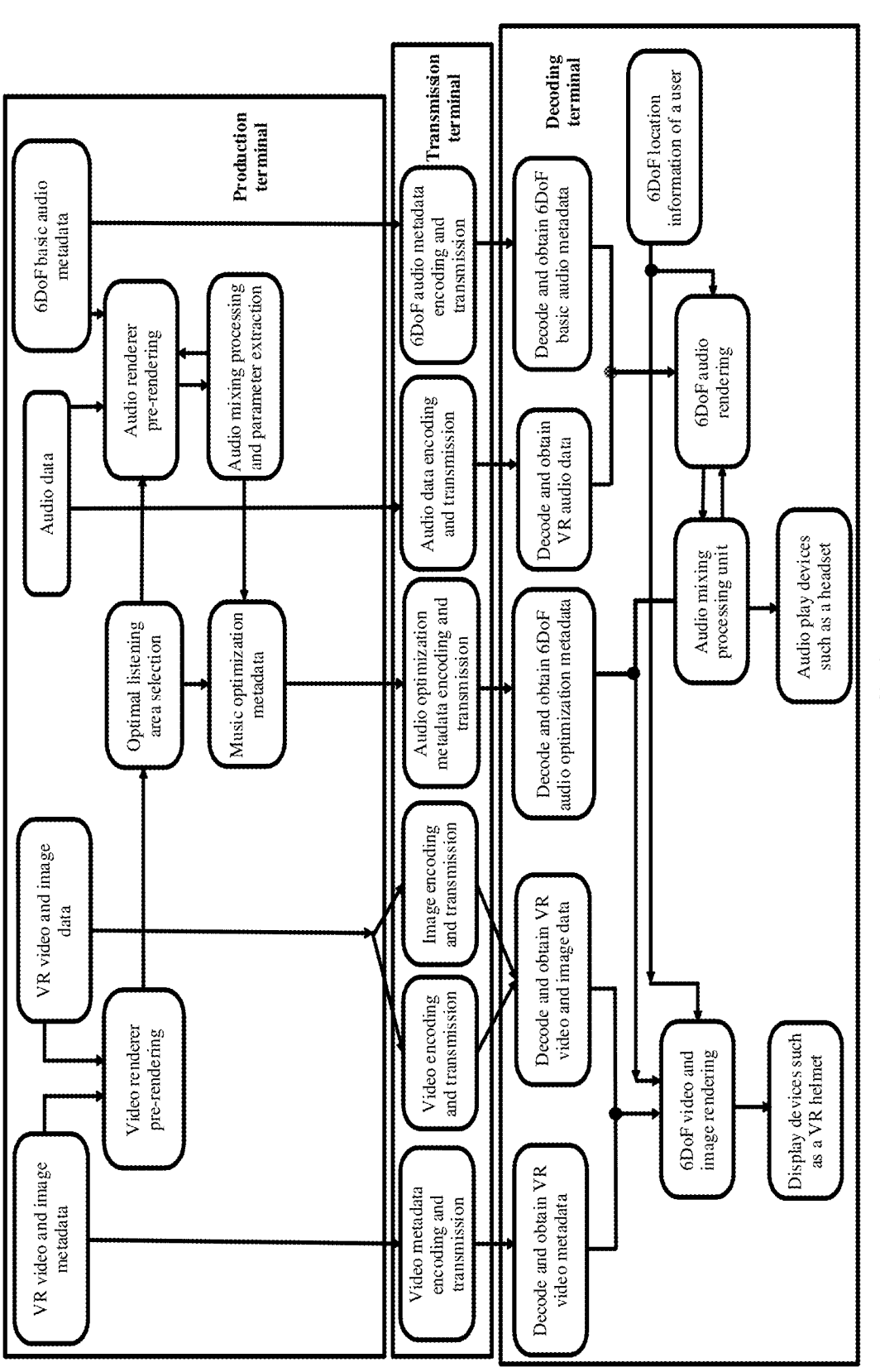
FIG. 4 is an end-to-end flowchart of an example 6DoFVR music scene according to an embodiment of this application.

FIG. 4 is an end-to-end flowchart of an example 6DoFVR music scene according to an embodiment of this application. A production terminal, a transmission terminal, and a decoding terminal are mainly included. The following separately provides descriptions by using examples from the perspective of different terminal sides.

A process performed by the production terminal includes: VR video scene and metadata production, audio data and 6DoF basic audio metadata production, sweet spot selection, audio mixing and audio mixing parameter extraction, audio optimization metadata production, and the like.

The production terminal includes a VR video and image data module, a VR video and image metadata module, a VR audio data module, a 6DoF basic audio metadata module, a video renderer rendering module, a sweet spot obtaining module, an audio renderer pre-rendering module, an audio mixing module, and an audio optimization metadata module.

The VR video and image data module is configured to obtain to-be-transmitted video and image data.

The VR video and image metadata module is configured to obtain video and image metadata that is produced in a VR scene.

The VR audio data module is configured to obtain to-be-transmitted audio data. Each piece of audio data may be object-based audio data, multi-channel-based audio (channel-based audio) data, or scene-based audio data.

The 6DoF basic audio metadata module is configured to obtain 6DoF basic audio metadata that is produced in the VR scene. For example, metadata types that may be included in the 6DoF basic audio metadata may be one or more types of metadata in Table 1.

The video renderer rendering module is configured to perform rendering based on VR video and image data and VR video and image metadata, to generate a first VR video scene.

The sweet spot obtaining module is configured to obtain sweet spot information in the VR scene. A sweet spot is selected based on the rendered VR video scene. There are one or N sweet spots. The sweet spot information includes a reference coordinate system, central location coordinates, a shape, and other information. Optionally, the sweet spot information includes the central location coordinates and the shape. The shape of the sweet spot may be a sphere, a cube, a column, or any other shape.

The audio renderer pre-rendering module is configured to separately perform first rendering on M pieces of audio data (denoted as first audio data) for each sweet spot based on central location coordinates of the sweet spot, VR audio data, and the 6DoF basic audio metadata, to obtain M pieces of rendered audio data (denoted as second audio data). An audio signal obtained through first rendering may be a single-channel signal, or may be a binaural rendering signal. The N sweet spots have a total of N*M audio signals obtained through first rendering.

The audio mixing module is configured to perform first audio mixing on each audio signal obtained through first rendering, and extract a parameter of each audio mixing step of each audio signal in an audio mixing process, and the parameter is denoted as a first audio mixing parameter. Audio data obtained through audio mixing is denoted as third audio data. All audio signals in the third audio data are mixed to obtain a fourth audio signal. Second audio mixing is performed on the fourth audio signal, and a parameter of each audio mixing step is reserved. The parameter is denoted as a second audio mixing parameter. The audio mixing step may be completed by a VR music scene production terminal or completed by an audio mixing terminal.

The audio optimization metadata module is configured to obtain the sweet spot information, the first audio mixing parameter, and the second audio mixing parameter, and generate audio optimization metadata according to a specific data structure.

A process performed by the transmission terminal includes: compression encoding and transmission of a video scene and metadata, compression encoding and transmission of audio data, compression encoding and transmission of the 6DoF basic audio metadata, and compression encoding and transmission of the audio optimization metadata.

The transmission terminal includes a video and image metadata compression and transmission module, a video compression and transmission module, an image compression and transmission module, an audio optimization metadata compression and transmission module, an audio compression and transmission module, and a 6DoF basic audio metadata compression and transmission module.

The video and image metadata compression and transmission module is configured to perform compression encoding on video and image metadata, and transmit a generated bitstream.

The video compression and transmission module is configured to perform compression encoding on video data in the VR scene, and transmit a bitstream.

The image compression and transmission module is configured to perform compression encoding on image data in the VR scene, and transmit a bitstream.

The audio optimization metadata compression and transmission module is configured to perform compression encoding on the audio optimization metadata provided in this embodiment, and transmit a bitstream.

The audio compression and transmission module is configured to perform compression encoding on audio data in the VR scene, and transmit a bitstream.

The 6DoF basic audio metadata compression and transmission module is configured to perform compression encoding on the 6DoF basic audio metadata, and transmit a bitstream.

A process performed by the decoding terminal (in other words, a user end) includes: 6DoF location information obtaining of a user, 6DoF video rendering, 6DoF audio rendering, and the like. In this embodiment, decoded audio optimization metadata is used for 6DoF video rendering and 6DoF audio rendering.

The decoding terminal includes an audio and video decoder, a video renderer, and an audio renderer.

The audio and video decoder is configured to decode a bitstream to obtain decoded VR video and image data, video and image metadata, audio data, 6DoF basic audio metadata, and audio optimization metadata.

The video renderer is configured to render a VR video scene based on the decoded video and image data, the decoded video and image metadata, and location information of the user.

Optionally, the video renderer identifies a sweet spot based on sweet spot information in the decoded audio optimization metadata, and identifies a recommended 6DoF music experience route, so as to guide the user to experience 6DoF music better. The experience route may be a connection line between sweet spots, or the like. This is not limited in this embodiment.

Similar to pre-rendering and audio mixing processes of the production terminal, the audio renderer is configured to determine, based on the location information of the user and the sweet spot information in the audio optimization metadata, whether the user is in the sweet spot.

If a current location of the user is in a sweet spot, the audio renderer is configured to render each audio signal based on the 6DoF basic audio metadata and the location information of the user, to obtain a rendered signal. Audio mixing is performed on the rendered signal based on an audio mixing parameter corresponding to each decoded audio signal. After audio mixing is performed on all audio signals, all audios obtained through audio mixing are mixed. Final audio mixing is performed based on an audio mixing parameter of a mixed signal, and a processed audio signal is sent to an audio device such as a headset of the user.

If the user is not in the sweet spot, the audio renderer is configured to render each audio signal based on the 6DoF basic audio metadata and the location information of the user, and directly mix all rendered audios to generate a final binaural signal for playing.

The following describes in detail the audio processing method in embodiments of this application by using two specific embodiments.

Embodiment 1

Figure 5:
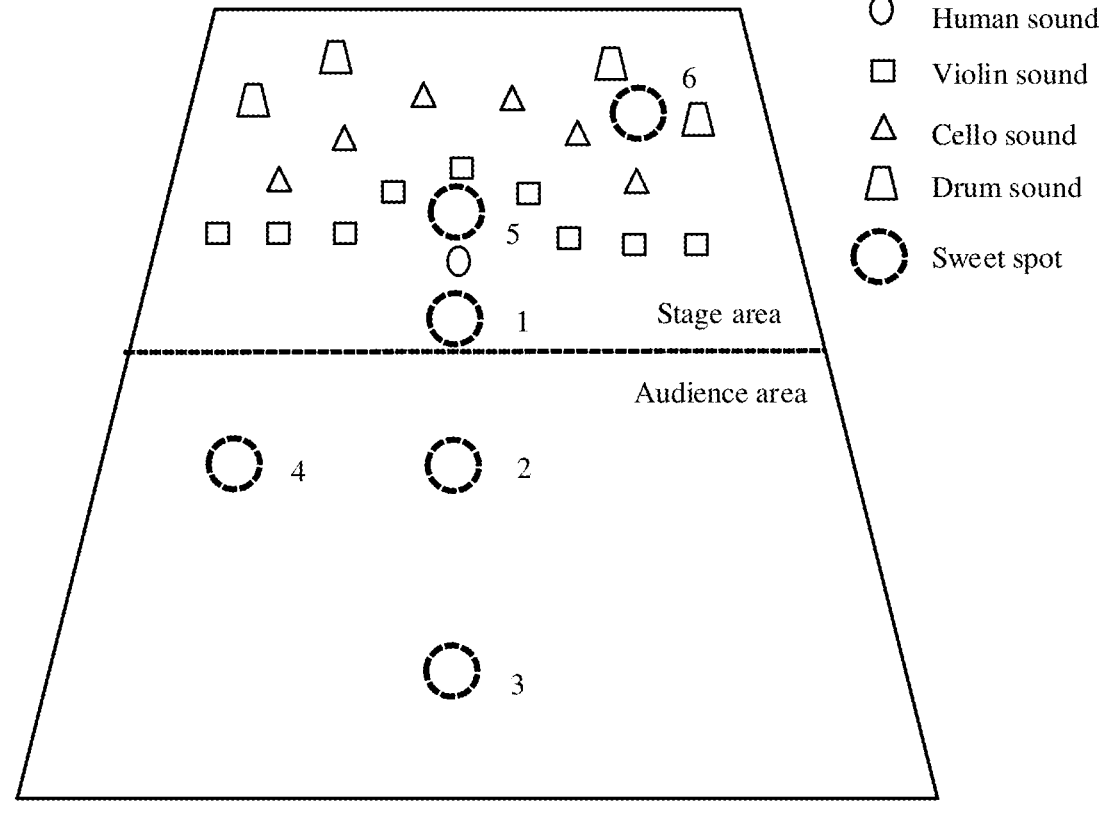
FIG. 5 is a schematic diagram of an example VR concert scene that supports 6DoF according to an embodiment of this application.

FIG. 5 is a schematic diagram of an example VR concert scene that supports 6DoF according to an embodiment of this application. A typical VR concert scene that supports 6DoF is used as an example to describe a technical solution in this embodiment in detail. The concert scene includes two parts: a stage area and an audience area, and there are four types of object sound sources: a human voice, a violin sound, a cello sound, and a drum sound. It is assumed that all the sound sources are static sound sources, and locations of the sound sources in the VR scene are shown in FIG. 5.

In this embodiment, an end-to-end process of the VR concert scene from a production terminal, a transmission terminal, to a decoding terminal is performed. A specific process of Embodiment 1 mainly includes the following steps.

Steps S01 to S05 are a process of the production terminal in a VR music scene, step S06 is a process of the transmission terminal in the VR music scene, and steps S07 and S08 are a process of the decoding terminal in the VR music scene.

S01: The production terminal obtains VR video and image data, VR video and image metadata, VR scene audio data, and 6DoF basic audio metadata.

The VR video and image data, the VR video and image metadata, the VR scene audio data, and the 6DoF basic audio metadata are pre-produced in the VR music scene.

S02: The production terminal obtains sweet spot metadata.

The production terminal renders the VR scene based on the VR video and image data and the VR video and image metadata, and then the production terminal selects a sweet spot in the VR scene, and records central location coordinates and shape information of each sweet spot. A quantity of sweet spots may be N, and the sweet spot selected by the production terminal should be consistent with a listening area in which a user is interested. Finally, the production terminal generates the sweet spot metadata based on sweet spot information according to a specific data structure.

The sweet spot metadata includes a reference coordinate system, central location coordinates, and shape information of the sweet spot. An example of a data structure of the sweet spot metadata is as follows:

```
<sweet spot identifier>
    <sweet spot 1 identifier>
    <reference coordinate system>
    <central location coordinates>
    <shape information>
    <sweet spot 2 identifier>
    <reference coordinate system>
    <central location coordinates>
    <shape information>
    ...
    <sweet spot N identifier>
    <reference coordinate system>
    <central location coordinates>
    <shape information>.
```

In addition, the shape of each sweet spot may be a sphere, a column, any shape formed by a triangular mesh, or the like. The sweet spot metadata includes the reference coordinate system and the central location coordinates of the sweet spot, and the shape information is shape information defaulted by the production terminal and the decoding terminal. An example of another data structure of the sweet spot metadata is as follows:

```
<sweet spot identifier>
    <sweet spot 1 identifier>
    <reference coordinate system>
    <central location coordinates>
    <sweet spot 2 identifier>
    <reference coordinate system>
    <central location coordinates>
    ...
    <sweet spot N identifier>
    <reference coordinate system>
    <central location coordinates>.
```

Data and data structures included in the sweet spot metadata are not limited to the foregoing two types. For example, central location information of a sweet spot 2 to a sweet spot N may be location information relative to the sweet spot 1.

S03: For each sweet spot, the production terminal performs first rendering on M pieces of audio data (denoted as first audio data) one by one based on the sweet spot metadata, VR audio data, and the 6DoF basic audio metadata, to obtain M pieces of rendered audio data (denoted as second audio data). An audio signal obtained through first rendering may be a single-channel signal, or may be a binaural rendering signal. N sweet spots have a total of N*M audio signals obtained through first rendering. The audio signals are denoted as second audio data. Each first audio signal may be an object-based signal, a multi-channel-based audio signal, or a scene-based audio signal.

S04: The production terminal performs audio mixing on each rendered audio signal to obtain a first audio mixing parameter in each sweet spot, and performs audio mixing on a final mixed signal to obtain a second audio mixing parameter.

The production terminal performs first audio mixing on each second audio signal, extracts a parameter of each audio mixing step of each audio signal in the audio mixing process, and the parameter is denoted as the first audio mixing parameter. Audio data obtained through audio mixing is denoted as third audio data.

Optionally, all audio signals in the third audio data are mixed to obtain a fourth audio signal. Second audio mixing is performed on the fourth audio signal, and a parameter of each audio mixing step is reserved. The parameter is denoted as the second audio mixing parameter. The two audio mixing steps may be completed by the production terminal in the VR music scene.

Each of the first audio mixing parameter and the second audio mixing parameter includes an identification number, an equalization parameter, a compressor parameter, and a reverberator parameter of an audio signal. The equalization parameter includes a frequency band, a gain value, and a Q value. The Q value is a parameter of an equalization filter, represents a quality factor of the equalization filter, and may be used to describe bandwidth of the equalization filter. The compressor parameter includes a threshold, a compression ratio, a start time, a release time, and a gain compensation value. The reverberator parameter includes a reverberation time, a delay time, and a direct-to-reverberant ratio.

Optionally, an audio mixing parameter of an important audio mixing step may be reserved based on a specific application scenario. Audio mixing parameter types included in the first audio mixing parameter and the second audio mixing parameter may be different.

S05: The production terminal generates, according to a specific data structure, 6DoF audio optimization metadata based on the sweet spot metadata and an audio mixing parameter corresponding to each sweet spot. The sweet spot metadata and the audio mixing parameters in step S04 may be stored and transmitted in a form of mutually independent data structures. A data structure of the sweet spot metadata is shown in step S02. An example of a data structure of the audio mixing parameters is as follows:

```
<audio mixing metadata identifier>
    <sweet spot 1 identifier>
    <audio signal 1 identification id>
        <equalization parameter identifier>
            <frequency band 1>
                <gain value>
                <Q value>
            ...
            <frequency band P>
                <gain value>
                <Q value>
        <compressor parameter identifier>
            <threshold>
            <compression rate>
            <start time>
            <release time>
            <gain compensation value>
        <reverberator parameter>
            <reverberation type>
            <reverberation time>
            <delay time>
            <direct-to-reverberant ratio>
```

-continued

```
        <...>
        ...
        ...
    <audio signal M identification id>
        <equalization parameter identifier>
            <frequency band 1>
                <gain value>
                <Q value>
            ...
            <frequency band P>
                <gain value>
                <Q value>
        <compressor parameter identifier>
            <threshold>
            <compression rate>
            <start time>
            <release time>
            <gain compensation value>
        <reverberator parameter>
            <reverberation type>
            <reverberation time>
            <delay time>
            <direct-to-reverberant ratio>
            <...>
        ...
    <second audio mixing parameter identifier>
        <equalization parameter identifier>
            <frequency band 1>
                <gain value>
                <Q value>
            ...
            <frequency band P>
                <gain value>
                <Q value>
        <compressor parameter identifier>
            <threshold>
            <compression rate>
            <start time>
            <release time>
            <gain compensation value>
        <reverberator parameter>
            <reverberation type>
            <reverberation time>
            <delay time>
            <direct-to-reverberant ratio>
        ...
    <sweet spot N identifier>
    ...
```

It should be noted that the sweet spot N identifier and an audio mixing parameter of the sweet spot 1 have a same data structure.

In the foregoing data structure, types of audio mixing parameters in the sweet spot 1 to the sweet spot N are completely the same.

Optionally, a parameter type stored in the sweet spot 1 is the same as the foregoing data structure, and audio mixing parameters of the sweet spot 2 to the sweet spot N are difference parameters with respect to the audio mixing parameter of the sweet spot 1, thereby reducing a quantity of parameters of the 6DoF audio optimization metadata.

Optionally, the data structure of the sweet spot metadata and the data structure of the audio mixing parameter are integrated into a same data structure, thereby reducing a quantity of parameters of the 6DoF audio optimization metadata.

S06: In addition to encoding and transmitting the VR video and image data, the VR video and image metadata, audio data, and the 6DoF basic audio metadata, the transmission terminal further needs to encode and transmit the 6DoF audio optimization metadata.

Optionally, a sweet spot metadata change identifier and an audio mixing parameter change identifier are added to an encoded 6DoF audio optimization metadata, so as to improve transmission efficiency of the 6DoF audio optimization metadata. When the VR music scene is initialized, the initial audio optimization metadata is transmitted. When the VR scene changes and the location and shape information of the sweet spot changes, the sweet spot metadata change identifier is true, and change information of the sweet spot is transmitted. When audio mixing metadata of a current frame changes, the audio mixing parameter change identifier is true, and change information of the audio mixing metadata is transmitted.

S07: At the decoding terminal, a VR head-mounted device of the user or the like obtains 6DoF location information of the user, and a video renderer renders a video based on decoded VR video and image data, VR video and image metadata, and the location information of the user. In addition, the sweet spot is identified based on decoded sweet spot metadata. Optionally, a recommended 6DoF music experience route may be further identified, so as to guide the user to experience 6DoF music better.

S08: At the decoding terminal, the VR head-mounted device of the user obtains the 6DoF location information of the user, and an audio decoder decodes an audio bitstream to obtain first decoded audio data, decoded 6DoF basic audio metadata, and decoded 6DoF audio optimization metadata. The audio renderer determines, based on the location information of the user and the decoded sweet spot metadata, whether the user is located in the sweet spot.

If the current location of the user is in the sweet spot, each first decoder-end audio signal is rendered based on the 6DoF basic audio metadata and the location information of the user, to obtain M rendered audio signals (denoted as second decoder-end audio signals). Audio mixing is performed on each second decoder-end audio signal based on a decoded first audio mixing parameter, to obtain M third decoder-end audio signals. The M third decoder-end audio signals are mixed based on the 6DoF basic audio metadata, and if a decoded second audio mixing parameter exists, second audio mixing is performed on a mixed signal to obtain a final music signal. When the current location of the user is in the sweet spot, optimal immersive music experience can be provided for the user.

If the current location of the user is outside the sweet spot, the audio renderer separately renders each first decoder-end audio signal based on the 6DoF basic audio metadata and the location information of the user, to obtain M rendered audio signals (denoted as the second decoder-end audio signals). The M second decoder-end audio signals are mixed to obtain a final music signal.

Optionally, a transition distance is set in each sweet spot, and a smoothing algorithm is used to ensure that a heard music signal can naturally transition when the user moves freely inside and outside the sweet spot. The smoothing algorithm is not limited in this embodiment.

For example, an area that is at a specific distance (that is, a transition distance) away from an edge of the sweet spot may be set as a transition area. In the transition area, each parameter of the 6DoF audio optimization metadata gradually changes to zero, so that music effect heard by the user can be naturally transitioned.

Embodiment 2

Figure 6:
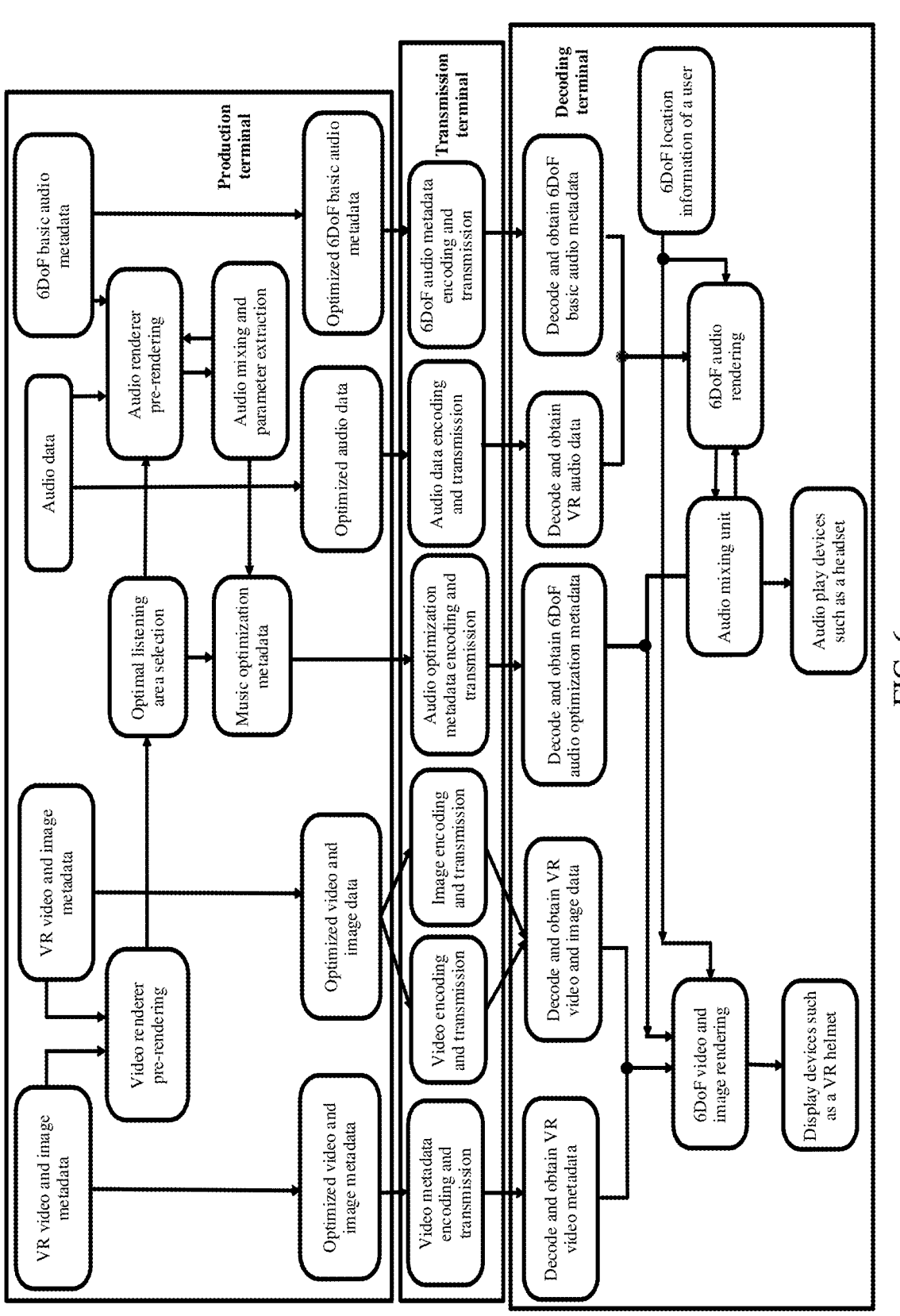
FIG. 6 is an end-to-end flowchart of another example 6DoFVR music scene according to an embodiment of this application.

FIG. 6 is an end-to-end flowchart of another example 6DoFVR music scene according to an embodiment of this application.

A main difference between Embodiment 2 and Embodiment 1 lies in that processes of the production end in the 6DoF music scene are different. In Embodiment 1, during audio mixing in step S04, audio mixing is performed to extract audio mixing metadata while produced VR video metadata, VR video data, audio data, and 6DoF basic audio metadata are kept unchanged.

In Embodiment 2, in an audio mixing process in step S04, the produced VR video metadata, VR video data, audio data, and 6DoF basic audio metadata may be adjusted and optimized, and the audio mixing metadata is extracted at the same time. For example, in the audio mixing process in step S04, a VR scene production terminal may adjust an audio frequency response and a gain, and may adjust a location of an object sound source, an acoustic parameter of a room, or the like.

Compared with Embodiment 1, the audio mixing metadata in Embodiment 2 is less than that in Embodiment 1, and 3D immersive music effect after audio mixing may also be better than that in Embodiment 1. In the production process shown in Embodiment 1, the basic 6DoF audio metadata is not modified, and only new audio optimization metadata is generated. However, in Embodiment 2, the 6DoF basic audio metadata is adjusted. For example, if a sound of an instrument directly in front does not sound harmonious, a location of the instrument may be adjusted in a VR video scene, and sound source location information corresponding to the instrument in the 6DoF basic audio metadata is modified.

Optionally, reverberation effect of a music signal heard by a user is adjusted by adjusting an acoustic parameter of the room in the 6DoF basic audio metadata, and the first audio mixing parameter and the second audio mixing parameter in Embodiment 1 may not include the reverberator parameter.

Optionally, a frequency response of one or more audio signals in audio data in FIG. 6 or parameters such as a location and a gain of an audio signal of the 6DoF basic audio metadata in FIG. 6 is adjusted, so as to adjust effect of the music signal finally heard by the user. The first audio mixing parameter in Embodiment 1 may not include equalization parameters corresponding to these signals.

It can be learned by using an example description of the foregoing embodiment that an embodiment of this application provides a method for producing, transmitting, and rendering a 6DoF virtual music scene. A decoding terminal can guide the user to experience the 6DoF music scene more reasonably, and effectively transfer personal aesthetics of music to the user. The user can hear more perfect 3D immersive music in each sweet spot, and the user has different music experience in different sweet spots. In addition, it is proposed in this embodiment that a sweet spot location change identifier and an audio mixing parameter change identifier may be added to the 6DoF audio optimization metadata, so that transmission efficiency of the 6DoF audio optimization metadata can be effectively improved.

It should be noted that, for a brief description, the foregoing method embodiments are represented as a series of actions. However, a person skilled in the art should appreciate that this application is not limited to the described order of the actions, because according to this application, some steps may be performed in other orders or simultaneously. The person skilled in the art should appreciate that embodiments described in this specification all belong to example embodiments, and the involved actions and modules are not necessarily required by this application.

To better implement the solutions of embodiments of this application, a related apparatus for implementing the solutions is further provided below.

Figure 7:
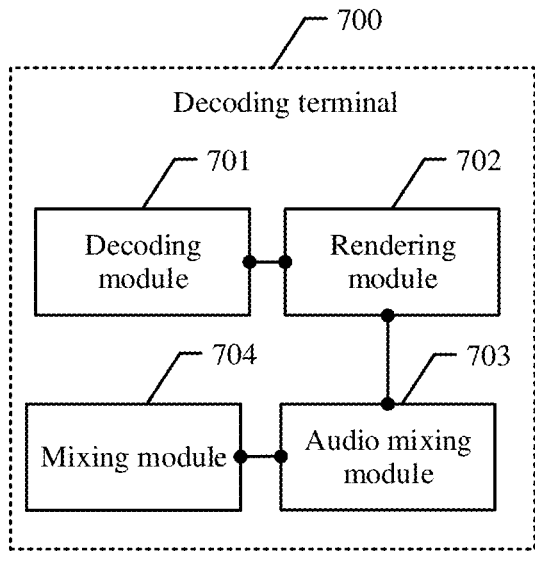
FIG. 7 is a schematic diagram of a composition structure of an example decoding terminal according to an embodiment of this application.

As shown in FIG. 7, a decoding terminal 700 provided in an embodiment of this application may include a decoding module 701, a rendering module 702, an audio mixing module 703, and a mixing module 704.

The decoding module is configured to decode an audio bitstream to obtain audio optimization metadata, basic audio metadata, and M pieces of decoded audio data. The audio optimization metadata includes first metadata of a first optimized listening area and a first decoding audio mixing parameter corresponding to the first optimized listening area, and M is a positive integer.

The rendering module is configured to render M pieces of decoded audio data based on the current location of a user and the basic audio metadata, to obtain M pieces of rendered audio data.

The audio mixing module is configured to: when the current location is in the first optimized listening area, perform first audio mixing on the M pieces of rendered audio data based on the first decoding audio mixing parameter, to obtain M pieces of first audio mixing data.

The mixing module is configured to mix the M pieces of first audio mixing data, to obtain mixed audio data corresponding to the first optimized listening area.

In the foregoing embodiment of this application, the audio optimization metadata in this embodiment includes the first metadata of the first optimized listening area and the first audio mixing parameter corresponding to the first optimized listening area, and the first optimized listening area is determined based on the current location of the user. Therefore, the first decoding audio mixing parameter corresponding to the first optimized listening area can be obtained to perform audio mixing. Therefore, audio optimization metadata suitable for the user to freely move to the first optimized listening area can be provided, and listening effect obtained when the user moves freely can be improved.

Figure 8:
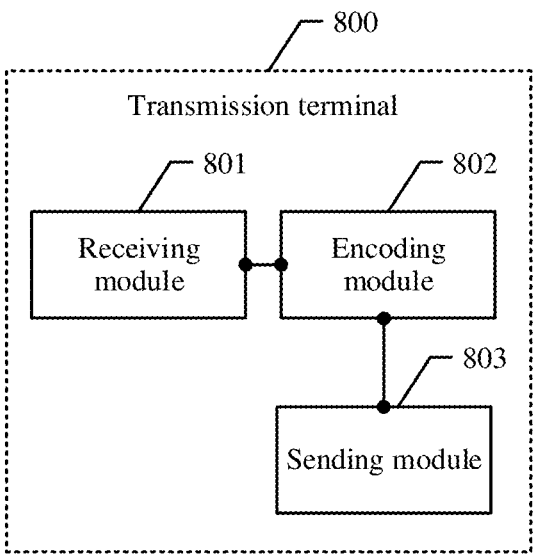
FIG. 8 is a schematic diagram of a composition structure of an example transmission terminal according to an embodiment of this application.

As shown in FIG. 8, a transmission terminal 800 provided in an embodiment of this application may include a receiving module 801, an encoding module 802, and a sending module 803.

The receiving module is configured to receive audio optimization metadata, basic audio metadata, and M pieces of first audio data. The audio optimization metadata includes first metadata of a first optimized listening area and a first audio mixing parameter corresponding to the first optimized listening area, and M is a positive integer.

The encoding module is configured to perform compression encoding on the audio optimization metadata, the basic audio metadata, and the M pieces of first audio data, to obtain an audio bitstream.

The sending module is configured to send the audio bitstream.

In the foregoing embodiment of this application, the audio optimization metadata from a production terminal is first received, the audio bitstream is generated based on the audio optimization metadata, and the audio bitstream is sent to a decoding terminal. The decoding terminal may obtain the audio optimization metadata by using the audio bitstream. The audio optimization metadata includes the first metadata of the first optimized listening area and the first audio mixing parameter corresponding to the first optimized listening area. Therefore, audio optimization metadata suitable for a user to freely move to the first optimized listening area can be provided, and listening effect obtained when the user moves freely can be improved.

Figure 9:
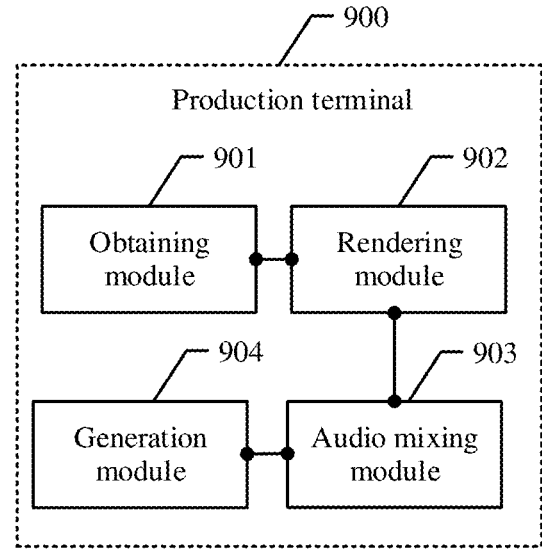
FIG. 9 is a schematic diagram of a composition structure of an example production terminal according to an embodiment of this application.

As shown in FIG. 9, a production terminal 900 provided in an embodiment of this application may include an obtaining module 901, a rendering module 902, an audio mixing module 903, and a generation module 904.

The obtaining module is configured to obtain basic audio metadata and metadata of N optimized listening areas, where N is a positive integer, and the N optimized listening areas include a first optimized listening area.

The rendering module is configured to render M pieces of to-be-processed audio data based on the first optimized listening area and the basic audio metadata, to obtain M pieces of rendered audio data corresponding to the first optimized listening area, where M is a positive integer.

The audio mixing module is configured to perform first audio mixing on the M pieces of rendered audio data, to obtain M pieces of first audio mixing data and a first audio mixing parameter corresponding to the first optimized listening area.

The generation module is configured to generate audio optimization metadata based on first metadata of the first optimized listening area and the first audio mixing parameter. The audio optimization metadata includes the first metadata and the first audio mixing parameter.

In the foregoing embodiment of this application, the metadata of the N optimized listening areas may be obtained, and the N optimized listening areas include the first optimized listening area. Therefore, M pieces of first audio data can be rendered and mixed for the first optimized listening area. Finally, the audio optimization metadata may be generated, and the audio optimization metadata includes the first metadata of the first optimized listening area and the first audio mixing parameter corresponding to the first optimized listening area. Therefore, audio optimization metadata suitable for a user to freely move to the first optimized listening area can be provided, and listening effect obtained when the user moves freely can be improved.

It should be noted that, content such as information exchange between the modules/units of the apparatus and the execution processes thereof is based on the same idea as the method embodiments of this application, and produces the same technical effect as the method embodiments of this application. For specific content, refer to the foregoing descriptions in the method embodiments of this application.

An embodiment of this application further provides a computer storage medium. The computer storage medium stores a program, and the program performs some or all of the steps described in the foregoing method embodiments.

Figure 10:
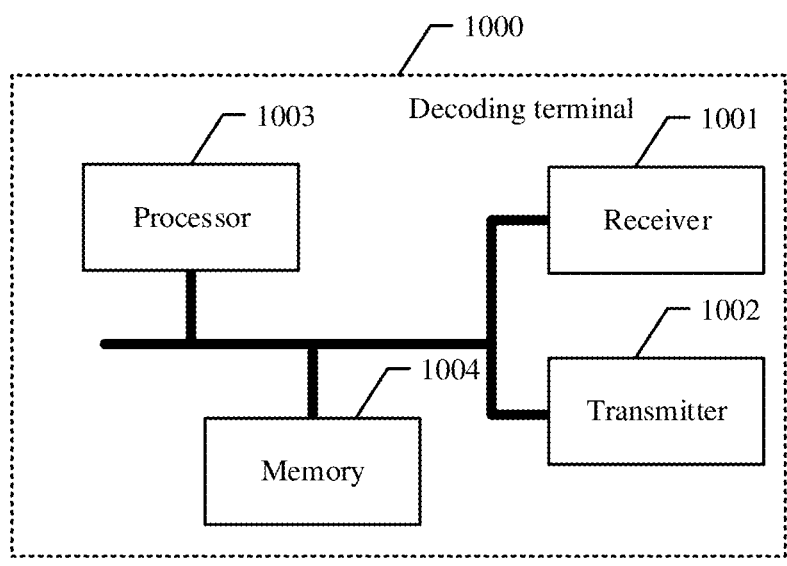
FIG. 10 is a schematic diagram of a composition structure of another example decoding terminal according to an embodiment of this application.

The following describes another decoding terminal according to an embodiment of this application. As shown in FIG. 10, a decoding terminal 1000 includes:

a receiver 1001, a transmitter 1002, a processor 1003, and a memory 1004 (there may be one or more processors 1003 in the decoding terminal 1000, and one processor is used as an example in FIG. 10). In some embodiments of this application, the receiver 1001, the transmitter 1002, the processor 1003, and the memory 1004 may be connected through a bus or in another manner. In FIG. 10, the receiver 1001, the transmitter 1002, the processor 1003, and the memory 1004 are connected through the bus is used as an example.

The memory 1004 may include a read-only memory and a random access memory, and provide instructions and data for the processor 1003. A part of the memory 1004 may further include a non-volatile random access memory (NVRAM). The memory 1004 stores an operating system and operation instructions, an executable module or a data structure, a subset thereof, or an extended set thereof. The operation instruction may include various operation instructions for implementing various operations. The operating system may include various system programs, to implement various basic services and process a hardware-based task.

The processor 1003 controls an operation of the decoding terminal, and the processor 1003 may also be referred to as a central processing unit (CPU). In specific applications, components of the decoding terminal are coupled together by using a bus system. In addition to a data bus, the bus system may further include a power bus, a control bus, and a status signal bus. However, for clear description, various types of buses in the figure are marked as the bus system.

The method disclosed in embodiments of this application may be applied to the processor 1003, or may be implemented by the processor 1003. The processor 1003 may be an integrated circuit chip, and has a signal processing capability. In an implementation process, steps in the method can be implemented by using a hardware integrated logical circuit in the processor 1003, or by using instructions in a form of software. The processor 1003 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor 1003.

The receiver 1001 may be configured to receive input digital or character information, and generate signal input related to related setting and function control of the decoding terminal. The transmitter 1002 may include a display device such as a display, and the transmitter 1002 may be configured to output digital or character information by using an external interface.

In this embodiment, the processor 1003 is configured to perform the method that is performed by the decoding terminal and that is shown in FIG. 2A and FIG. 2B in the foregoing embodiment.

Figure 11:
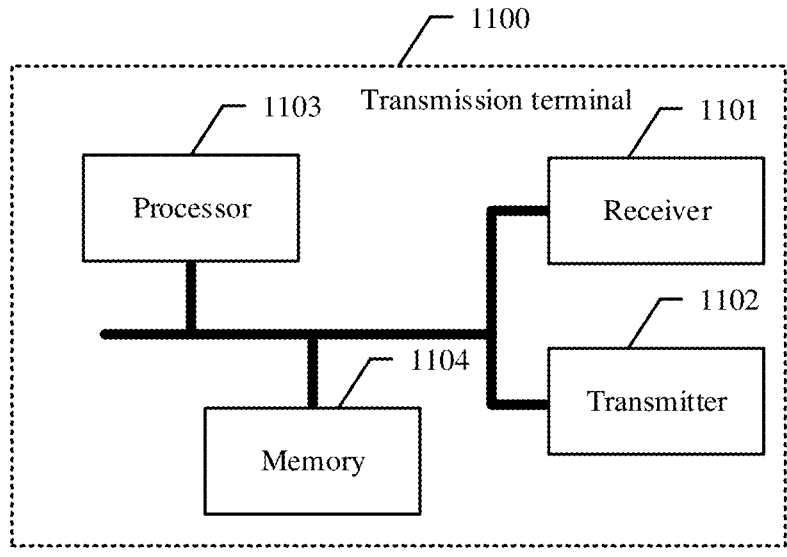
FIG. 11 is a schematic diagram of a composition structure of another example transmission terminal according to an embodiment of this application.

The following describes another transmission terminal provided in an embodiment of this application. As shown in FIG. 11, a transmission terminal 1100 includes:

a receiver 1101, a transmitter 1102, a processor 1103, and a memory 1104 (there may be one or more processors 1103 in the transmission terminal 1100, and one processor is used as an example in FIG. 11). In some embodiments of this application, the receiver 1101, the transmitter 1102, the processor 1103, and the memory 1104 may be connected through a bus or in another manner. In FIG. 11, the receiver 1101, the transmitter 1102, the processor 1103, and the memory 1104 are connected through the bus is used as an example.

The memory 1104 may include a read-only memory and a random access memory, and provide instructions and data to the processor 1103. A part of the memory 1104 may further include a non-volatile random access memory (NVRAM). The memory 1104 stores an operating system and operating instructions, and an executable module or a data structure, a subset thereof, or an extended set thereof, where the operating instructions may include various operating instructions and are used to implement various operations. The operating system may include various system programs, to implement various basic services and process a hardware-based task.

The processor 1103 controls an operation of the transmission terminal, and the processor 1103 may also be referred to as a central processing unit (CPU). In specific applications, components of the transmission terminal are coupled together by using a bus system. In addition to a data bus, the bus system may further include a power bus, a control bus, and a status signal bus. However, for clear description, various types of buses in the figure are marked as the bus system.

The method disclosed in the foregoing embodiments of this application may be applied to the processor 1103, or implemented by the processor 1103. The processor 1103 may be an integrated circuit chip and has a signal processing capability. In an implementation process, steps in the foregoing method may be completed by using an integrated logic circuit of hardware in the processor 1103 or an instruction in a form of software. The processor 1103 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1104, and the processor 1103 reads information in the memory 1104 and completes the steps in the foregoing methods in combination with hardware of the processor 1103.

The receiver 1101 may be configured to receive input digital or character information, and generate signal input related to related setting and function control of the transmission terminal. The transmitter 1102 may include a display device such as a display, and the transmitter 1102 may be configured to output digital or character information by using an external interface.

In this embodiment, the processor 1103 is configured to perform the method that is performed by the transmission terminal and that is shown in FIG. 2A and FIG. 2B in the foregoing embodiment.

Figure 12:
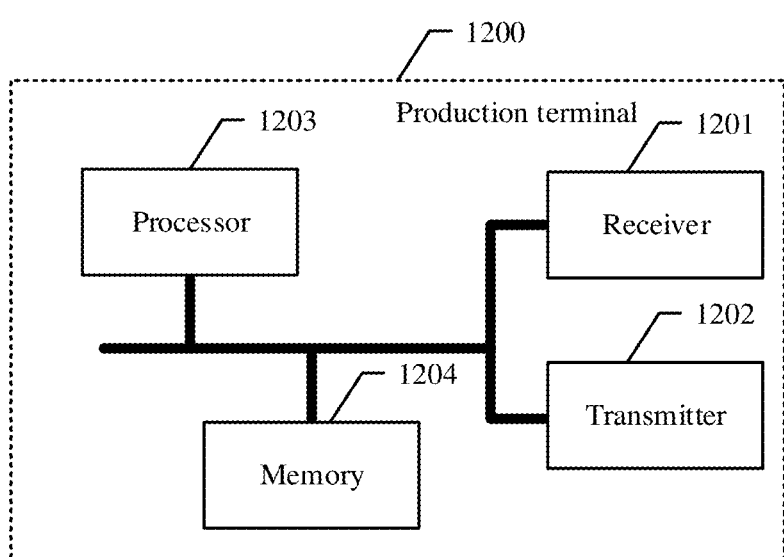
FIG. 12 is a schematic diagram of a composition structure of another example production terminal according to an embodiment of this application.

The following describes another production terminal provided in an embodiment of this application. As shown in FIG. 12, a production terminal 1200 includes:

a receiver 1201, a transmitter 1202, a processor 1203, and a memory 1204 (there may be one or more processors 1203 in the production terminal 1200, and one processor is used as an example in FIG. 12). In some embodiments of this application, the receiver 1201, the transmitter 1202, the processor 1203, and the memory 1204 may be connected through a bus or in another manner. In FIG. 12, the receiver 1201, the transmitter 1202, the processor 1203, and the memory 1204 are connected through the bus is used as an example.

The memory 1204 may include a read-only memory and a random access memory, and provide instructions and data to the processor 1203. A part of the memory 1204 may further include an NVRAM. The memory 1204 stores an operating system and operation instructions, an executable module or a data structure, a subset thereof, or an extended set thereof. The operation instructions may include various operation instructions used to implement various operations. The operating system may include various system programs, to implement various basic services and process a hardware-based task.

The processor 1203 controls an operation of the production terminal, and the processor 1203 may also be referred to as a CPU. In specific application, components of the production terminal are coupled together by using a bus system. In addition to a data bus, the bus system may further include a power bus, a control bus, and a status signal bus. However, for clear description, various types of buses in the figure are marked as the bus system.

The method disclosed in embodiments of this application may be applied to the processor 1203, or may be implemented by the processor 1203. The processor 1203 may be an integrated circuit chip, and has a signal processing capability. During implementation, the steps in the foregoing method may be completed by using a hardware integrated logic circuit in the processor 1203 or instructions in the form of software. The processor 1203 may be a general-purpose processor, a DSP, an ASIC, an FPGA or another programmable logical device, a discrete gate or a transistor logical device, or a discrete hardware assembly. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204, and completes the steps of the foregoing method in combination with hardware of the processor 1203.

In this embodiment, the processor 1203 is configured to perform the audio processing method that is performed by the production terminal and that is shown in FIG. 2A and FIG. 2B in the foregoing embodiment.

In another example embodiment, when the decoding terminal, the transmission terminal, or the production terminal is a chip in the terminal, the chip includes a processing unit and a communication unit. The processing unit may be, for example, a processor, and the communication unit may be, for example, an input/output interface, a pin, a circuit, or the like. The processing unit may execute a computer-executable instruction stored in a storage unit, so that the chip in the terminal performs the audio processing method in any one of the first aspect to the third aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that can store static information and instructions, or a random access memory (RAM).

The processor mentioned above may be a general-purpose central processing unit, a microprocessor, an ASIC, or one or more integrated circuits configured to control program execution of the method in the first aspect to the third aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in the form of a software product. The computer software product is stored in a readable storage medium, such as a floppy disk, a USB flash drive, a removable hard disk, a ROM, a RAM, a magnetic disk, or an optical disc of a computer, and includes several instructions that enable a computer device (which may be a personal computer, a server, a network device, or the like) to perform the methods described in embodiments of this application.

All or some of the foregoing embodiments may be implemented by using software, hardware, firmware, or any combination thereof. When software is used to implement embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. An audio processing method, comprising:
decoding an audio bitstream to obtain audio optimization metadata, basic audio metadata, and M pieces of decoded audio data, wherein the audio optimization metadata comprises first metadata of a first optimized listening area and a first decoding audio mixing parameter corresponding to the first optimized listening area, and M is a positive integer;
rendering M pieces of decoded audio data based on a current location of a user and the basic audio metadata, to obtain M pieces of rendered audio data; and
when the current location is in the first optimized listening area, performing first audio mixing on the M pieces of rendered audio data based on the first decoding audio mixing parameter, to obtain M pieces of first audio mixing data; and
mixing the M pieces of first audio mixing data, to obtain mixed audio data corresponding to the first optimized listening area.

2. The method according to claim 1, wherein the audio optimization metadata further comprises a second decoding audio mixing parameter corresponding to the first optimized listening area; and
the method further comprises:
performing second audio mixing on the mixed audio data corresponding to the first optimized listening area based on the second decoding audio mixing parameter, to obtain second audio mixing data corresponding to the first optimized listening area.

3. The method according to claim 2, wherein the audio optimization metadata further comprises: N−1 difference parameters of N−1 second decoding audio mixing parameters, each relative to the second decoding audio mixing parameter corresponding to the first optimized listening area, wherein the N−1 second decoding audio mixing parameters correspond to N−1 optimized listening areas other than the first optimized listening area in N optimized listening areas and N is a positive integer.

4. The method according to claim 1, further comprising:
decoding a video image bitstream to obtain decoded video image data and video image metadata, wherein the video image metadata comprises video metadata and image metadata;
rendering the decoded video image data based on the video image metadata, to obtain rendered video image data;
establishing a virtual scene based on the rendered video image data; and
identifying the first optimized listening area in the virtual scene based on the rendered video image data and the audio optimization metadata.

5. The method according to claim 1, wherein the audio optimization metadata comprises: N−1 difference parameters of N−1 first decoding audio mixing parameters, each relative to the first decoding audio mixing parameter corresponding to the first optimized listening area, wherein the N−1 first decoding audio mixing parameters correspond to the N−1 optimized listening areas other than the first optimized listening area in the N optimized listening areas, and N is a positive integer.

6. The method according to claim 1, wherein the audio optimization metadata further comprises: central location coordinates of the first optimized listening area in the N optimized listening areas, and a location offset of central location coordinates of the N−1 optimized listening areas other than the first optimized listening area in the N optimized listening areas relative to the central location coordinates of the first optimized listening area, wherein N is a positive integer.

7. An audio processing method, comprising:
receiving audio optimization metadata, basic audio metadata, and M pieces of first audio data, wherein the audio optimization metadata comprises first metadata of a first optimized listening area and a first audio mixing parameter corresponding to the first optimized listening area, and M is a positive integer;
performing compression encoding on the audio optimization metadata, the basic audio metadata, and the M pieces of first audio data, to obtain an audio bitstream; and
sending the audio bitstream.

8. The method according to claim 7, wherein the audio optimization metadata further comprises a second audio mixing parameter change identifier, wherein
the second audio mixing parameter change identifier indicates whether a second audio mixing parameter corresponding to first audio data of a current frame changes compared with a second audio mixing parameter corresponding to first audio data of a previous frame.

9. The method according to claim 8, wherein the audio optimization metadata further comprises the second audio mixing parameter corresponding to the first optimized listening area in N optimized listening areas, and N−1 difference parameters of N−1 second audio mixing parameters, each relative to the second audio mixing parameter corresponding to the first optimized listening area, wherein the N−1 second audio mixing parameters correspond to N−1 optimized listening areas other than the first optimized listening area in the N optimized listening areas, and N is a positive integer.

10. The method according to claim 8, wherein the audio optimization metadata further comprises: an optimized listening area change identifier, and/or a first audio mixing parameter change identifier, wherein
the optimized listening area change identifier indicates whether the first optimized listening area changes; and
the first audio mixing parameter change identifier indicates whether a first audio mixing parameter corresponding to the first audio data of the current frame changes compared with a first audio mixing parameter corresponding to the first audio data of the previous frame.

11. The method according to claim 7, wherein the audio optimization metadata further comprises: N−1 difference parameters of N−1 first audio mixing parameters, each relative to the first audio mixing parameter corresponding to the first optimized listening area in N optimized listening areas, wherein the N−1 first audio mixing parameters correspond to the N−1 optimized listening areas other than the first optimized listening area in the N optimized listening areas, and N is a positive integer.

12. The method according to claim 7, wherein the audio optimization metadata further comprises: central location coordinates of the first optimized listening area in the N optimized listening areas, and a location offset of central location coordinates of the N−1 optimized listening areas other than the first optimized listening area in the N optimized listening areas relative to the central location coordinates of the first optimized listening area, wherein N is a positive integer.

13. An audio processing method, comprising:

obtaining basic audio metadata and metadata of N optimized listening areas, wherein N is a positive integer, and the N optimized listening areas comprise a first optimized listening area;

rendering M pieces of to-be-processed audio data based on the first optimized listening area and the basic audio metadata, to obtain M pieces of rendered audio data corresponding to the first optimized listening area, wherein M is a positive integer;

performing first audio mixing on the M pieces of rendered audio data, to obtain M pieces of first audio mixing data and a first audio mixing parameter corresponding to the first optimized listening area; and generating audio optimization metadata based on first metadata of the first optimized listening area and the first audio mixing parameter, wherein the audio optimization metadata comprises the first metadata and the first audio mixing parameter.

14. The method according to claim 13, further comprising: mixing the M pieces of first audio mixing data, to obtain mixed audio data corresponding to the first optimized listening area; and performing second audio mixing on the mixed audio data corresponding to the first optimized listening area, to obtain second audio mixing data corresponding to the first optimized listening area and a second audio mixing parameter corresponding to the first optimized listening area; and the generating audio optimization metadata based on first metadata of the first optimized listening area and the first audio mixing parameter comprises:

generating the audio optimization metadata based on the first metadata, the first audio mixing parameter, and the second audio mixing parameter.

15. The method according to claim 13, wherein the obtaining of the metadata of the N optimized listening areas comprises:

obtaining video image metadata and video image data, wherein the video image metadata comprises video metadata and image metadata, and the video image data comprises video data and image data;

rendering the video image data based on the video image metadata, to obtain video scene information; and obtaining the metadata of the N optimized listening areas based on the video scene information.

16. The method according to claim 13, wherein the rendering M pieces of to-be-processed audio data based on the first optimized listening area and the basic audio metadata comprises:

adjusting the basic audio metadata based on the mixed audio data corresponding to the first optimized listening area, to obtain adjusted basic audio metadata, wherein the mixed audio data is obtained by mixing the M pieces of first audio mixing data; and rendering the M pieces of to-be-processed audio data based on the first optimized listening area and the adjusted basic audio metadata.

17. A decoding terminal, comprising at least one processor and a memory, wherein the at least one processor and the memory communicate with each other; and the memory is configured to store instructions that;

when executed by the at least one processor cause the decoding terminal to:

decode an audio bitstream to obtain audio optimization metadata, basic audio metadata, and M pieces of decoded audio data, wherein the audio optimization metadata comprises first metadata of a first optimized listening area and a first decoding audio mixing parameter corresponding to the first optimized listening area, and M is a positive integer;

render M pieces of decoded audio data based on a current location of a user and the basic audio metadata, to obtain M pieces of rendered audio data; and when the current location is in the first optimized listening area, perform first audio mixing on the M pieces of rendered audio data based on the first decoding audio mixing parameter, to obtain M pieces of first audio mixing data, and mix the M pieces of first audio mixing data, to obtain mixed audio data corresponding to the first optimized listening area.

18. The decoding terminal according to claim 17, wherein, the instructions, when executed by the at least one processor, further cause the decoding terminal to:

decode a video image bitstream to obtain decoded video image data and video image metadata, wherein the video image metadata comprises video metadata and image metadata;

render the decoded video image data based on the video image metadata, to obtain rendered video image data;

establish a virtual scene based on the rendered video image data; and identify the first optimized listening area in the virtual scene based on the rendered video image data and the audio optimization metadata.

19. A production terminal, comprising at least one processor and a memory, wherein the at least one processor and the memory communicate with each other; and the memory is configured to store instructions that, when executed by the at least one processor cause the production terminal to:

obtain basic audio metadata and metadata of N optimized listening areas, wherein N is a positive integer, and the N optimized listening areas comprise a first optimized listening area;

render M pieces of to-be-processed audio data based on the first optimized listening area and the basic audio metadata, to obtain M pieces of rendered audio data corresponding to the first optimized listening area, wherein M is a positive integer;

perform first audio mixing on the M pieces of rendered audio data, to obtain M pieces of first audio mixing data and a first audio mixing parameter corresponding to the first optimized listening area; and generate audio optimization metadata based on first metadata of the first optimized listening area and the first audio mixing parameter, wherein the audio optimization metadata comprises the first metadata and the first audio mixing parameter.

20. The production terminal according to claim 19, wherein, the instructions, when executed by the at least one processor further cause the production terminal to:

mix the M pieces of first audio mixing data, to obtain mixed audio data corresponding to the first optimized listening area; and perform second audio mixing on the mixed audio data corresponding to the first optimized listening area, to obtain second audio mixing data corresponding to the first optimized listening area and a second audio mixing parameter corresponding to the first optimized listening area; and generate the audio optimization metadata based on the first metadata, the first audio mixing parameter, and the second audio mixing parameter.

\* \* \* \* \*